(12) United States Patent
Li et al.

(10) Patent No.: US 9,426,543 B1
(45) Date of Patent: Aug. 23, 2016

(54) SERVER-BASED VIDEO STITCHING

(71) Applicant: Vuclip, Milpitas, CA (US)

(72) Inventors: Minghui Li, San Jose, CA (US); Yaochun Huang, Fremont, CA (US); Bo Shen, Fremont, CA (US)

(73) Assignee: VUCLIP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/975,598

(22) Filed: Dec. 18, 2015

(51) Int. Cl.
| | |
|---|---|
| *H04N 7/173* | (2011.01) |
| *H04N 21/858* | (2011.01) |
| *H04N 21/234* | (2011.01) |
| *H04N 21/235* | (2011.01) |
| *H04N 21/81* | (2011.01) |
| *H04N 21/845* | (2011.01) |
| *H04N 21/8547* | (2011.01) |
| *H04N 21/2183* | (2011.01) |
| *H04N 21/4782* | (2011.01) |
| *H04N 21/61* | (2011.01) |
| *H04N 21/414* | (2011.01) |

(52) U.S. Cl.
CPC ....... *H04N 21/8586* (2013.01); *H04N 21/2183* (2013.01); *H04N 21/2353* (2013.01); *H04N 21/23424* (2013.01); *H04N 21/41407* (2013.01); *H04N 21/4782* (2013.01); *H04N 21/6175* (2013.01); *H04N 21/8133* (2013.01); *H04N 21/8173* (2013.01); *H04N 21/845* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 5,122,875 A | * | 6/1992 | Raychaudhuri | H04N 5/4401 348/390.1 |
| 5,287,178 A | * | 2/1994 | Acampora | H04N 21/236 348/384.1 |
| 5,294,977 A | * | 3/1994 | Fisher | H04N 7/17309 348/725 |
| 5,995,146 A | * | 11/1999 | Rasmussen | H04N 21/234363 348/461 |
| 6,233,253 B1 | * | 5/2001 | Settle | H04N 21/2365 370/474 |
| 6,490,243 B1 | * | 12/2002 | Tanaka | H03M 13/00 370/216 |
| 6,727,955 B2 | * | 4/2004 | Pereboom | H04H 20/16 348/465 |

(Continued)

FOREIGN PATENT DOCUMENTS

| | | | | |
|---|---|---|---|---|
| JP | 2004135307 A | * | 4/2004 | |
| JP | WO 2006114830 A1 | * | 11/2006 | ............ H04H 20/26 |
| JP | WO 2013008867 A1 | * | 1/2013 | ......... H04N 21/6125 |

*Primary Examiner* — Nicholas Corbo
(74) *Attorney, Agent, or Firm* — Wong & Rees LLP; Karl T. Rees

(57) ABSTRACT

Approaches, techniques, and mechanisms are disclosed for the server-based stitching of a sequence of video segments. According to one embodiment, rather than combining the segments together into a single video file, a server (e.g. a segment-based HTTP server) is configured to dynamically switch between streaming the different segments in the sequence. That is, for instance, as the server reaches the end of one segment, instead of terminating the streaming, the server retrieves the video data for the next segment and continues streaming content from the next segment. Thus, the server streams a sequence of multiple and distinct video segments from a single addressable location (e.g. a URL), rather than streaming the distinct video segments from separate addressable locations. To a client, the stream appears to be a single video stream, even though composed of audio/video data from separate and distinct files or sources.

35 Claims, 13 Drawing Sheets

(56) References Cited

U.S. PATENT DOCUMENTS

| | | | | |
|---|---|---|---|---|
| 8,594,093 B2* | 11/2013 | Lee | H04L 1/007 | 370/389 |
| 2001/0055319 A1* | 12/2001 | Quigley | H04L 1/203 | 370/480 |
| 2003/0081582 A1* | 5/2003 | Jain | H04B 7/18582 | 370/338 |
| 2008/0178208 A1* | 7/2008 | Kim | H04N 21/235 | 725/28 |
| 2008/0310411 A1* | 12/2008 | Yamauchi | H04N 21/2381 | 370/389 |
| 2009/0123131 A1* | 5/2009 | Morioka | H04L 9/0844 | 386/241 |
| 2011/0008024 A1* | 1/2011 | Sasaki | G11B 20/10527 | 386/354 |
| 2011/0066703 A1* | 3/2011 | Kaplan | H04L 65/4084 | 709/219 |
| 2011/0268178 A1* | 11/2011 | Park | H04N 21/23439 | 375/240.02 |
| 2012/0023254 A1* | 1/2012 | Park | H04L 47/2416 | 709/231 |
| 2012/0140769 A1* | 6/2012 | Hwang | H04L 65/602 | 370/389 |
| 2014/0280400 A1* | 9/2014 | Legay | G06F 17/30194 | 707/827 |

* cited by examiner

SERVER-BASED VIDEO STITCHING

TECHNICAL FIELD

Embodiments relate generally to video content distribution, and, more specifically, to techniques for delivery of sequences of video segments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The techniques described herein relate generally to media data structures composed of video data and, optionally, accompanying audio data. However, for ease of understanding, these media data structures are typically characterized herein as simply "video" structures, such as "video files," "video segments," and "video sequences." Any use of the term "video," as used herein, will therefore be understood to refer equally to media data structures that include both video and audio data, unless otherwise stated or apparent from usage.

It is often desirable, for a variety of purposes, to deliver sequences of videos to end-user devices. For instance, when a viewer requests a movie from a movie streaming service, the service may wish to deliver the movie in such a manner that the viewer must watch a group of trailers before the movie. As another example, a news service may wish to deliver a set of video clips in sequence as part of a news broadcast. As yet another example, a television broadcaster may wish to divide a television show into various video segments interspersed with advertisement videos. As yet another example, a content distribution service such as YouTube may allow content providers to create playlists of different video segments to play in a sequence.

The creation of such a sequence is sometimes referred to as "video stitching." More generally, video stitching may refer to the concatenation of two or more video segments in a sequence. Client-side video stitching is a common video stitching technique for video content downloaded or streamed over a network such as the Internet. Client-side video stitching is performed primarily by client application software executing on the viewer's own device, such as a web browser or mobile application. The client application software is configured by, for example, JavaScript or plugin code, to separately request each video segment of a sequence. Each video segment is from a different source address. The client application code "stitches" the segments together by transparently switching between playing the different video segments in an order corresponding to the sequence.

In many contexts, however, client-side video stitching is undesirable. For example, a client may be incapable of executing the proper instructions to implement client-side video stitching. Or, it may be desirable to present the stitched video to a client as a single video stream, so as to leverage the client's native support for fast-forwarding, skipping, or other trick-play operations through the entire sequence. For instance, it is sometimes desirable to stitch a video sequence together into a single video file that can be served via a web server through the Hyper-Text Transport Protocol (HTTP), by which means almost any modern web browser is capable of playing the video sequence.

Conventionally, server-side stitching involves processing each segment in a desired video sequence, concatenating the segments together into a single video file, and storing that file. Thus, the creation of a new sequence of video segments incurs great processing and storage costs. For example, consider a video stitching case in which an advertisement video is pre-rolled before a two hour movie. The content distributor may wish to offer different "versions" of the movie in which different advertisement videos are shown before the movie. For each version the content distributor wishes to make, the entire movie must be reprocessed with the relevant advertisement video(s), and each resulting stitched video must be stored as a separate copy of the movie. This overhead effectively limits the number of versions of the movie (i.e. the variety of advertisements before the movie) that the content distributor can effectively deliver.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
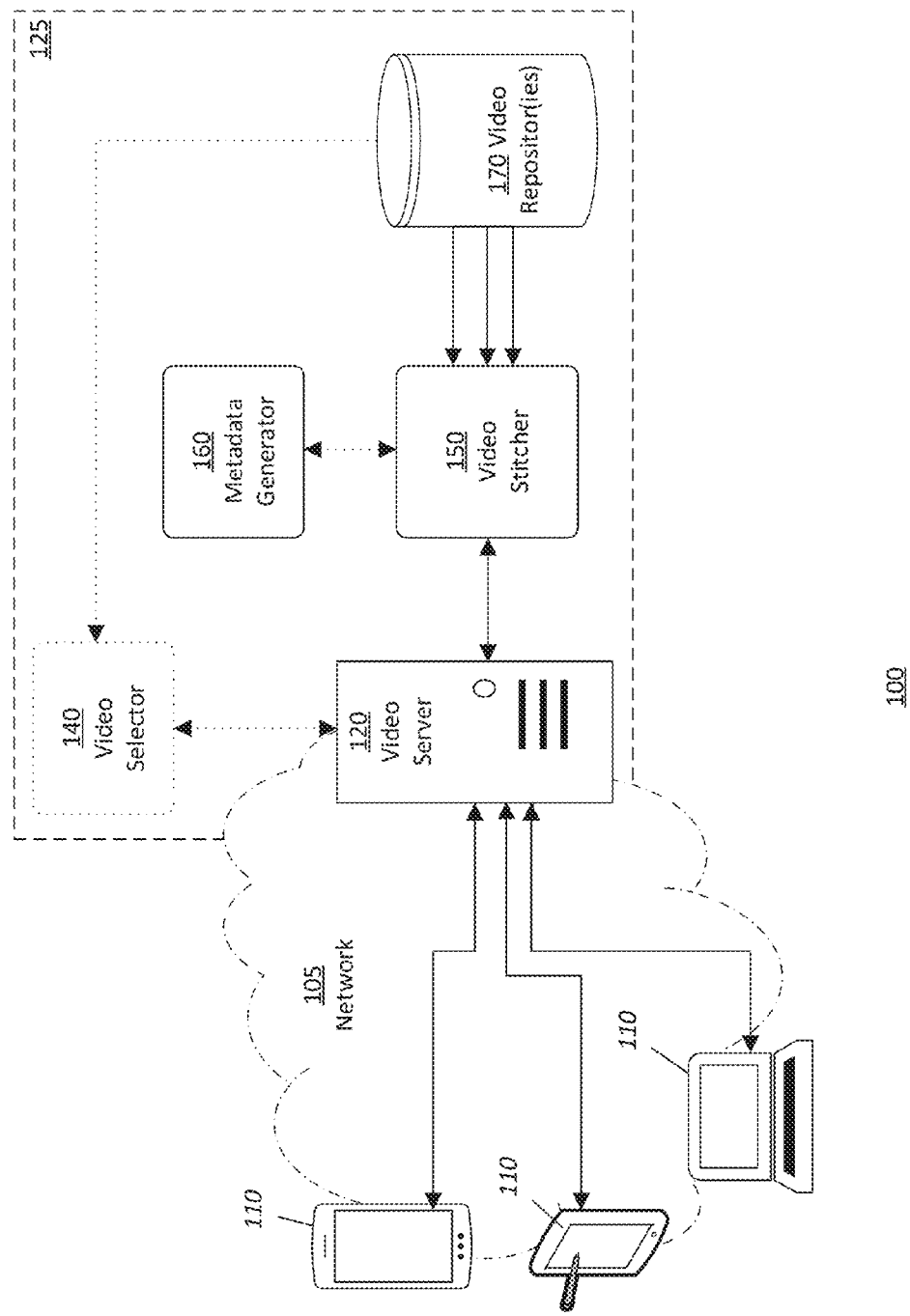
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Clients
2.2. Video Repository
2.3. Video Server
2.4. Video Selection
2.5. Video Stitching
2.6. Sessions
2.7. Link Generator
2.8. Miscellaneous
3.0. Functional Overview
3.1. Serving Stitched Video Sequences
3.2. Pre-Configuring the Video Server
3.3. Skipping Portions of the Stitched Sequence
3.4. Variations
4.0. Implementation Examples
4.1. Example Links
4.2. Proxy Server
4.3. Cache
4.4. Link Integrity Verification
4.5. Partial Segments
4.6. Example System
4.7. MPEG4-Based Example
5.0. Example Embodiments
6.0. Implementation Mechanism—Hardware Overview
7.0. Extensions and Alternatives 1.0. General Overview Approaches, techniques, and mechanisms are disclosed for the server-based stitching of a sequence of video segments. According to one embodiment, rather than combining the segments together into a single video file, a server (e.g. a segment-based HTTP server, a Real-time Streaming Protocol ("RTSP") server, etc.) is configured to dynamically switch between streaming the different segments in the sequence. That is, for instance, as the server reaches the end of one segment, instead of terminating the streaming, the server retrieves the video data for the next segment and continues streaming content from the next segment. Thus, the server streams a sequence of multiple and distinct video segments from a single addressable location (e.g. a Uniform Resource Locator or "URL"), rather than streaming the distinct video segments from separate addressable locations. To a client, the stream appears to be a single video stream, even though composed of audio/video data from separate and distinct files or sources.

According to an embodiment, the stitching involves transcoding the headers of the source video files and combining them to form a new header file for the sequence. The combined header file can be generated more quickly than stitching the entire sequence into a single video file, and is much smaller in size than such a single video file. The combined header file is served along with the audio/video data of the source video files, without further processing. In other words, the server does not serve the headers of the individual video files, only the combined header file followed by the audio/video portions of the individual video files. In a streaming embodiment, a standard HTTP client (e.g. a conventional web browser) can play the received data as if the received data were a stream of a single video file served by a standard HTTP server. Such a configuration permits, for instance, seamless seeking back and forth between byte offsets within the sequence, even when crossing boundaries between multiple video segments.

According to an embodiment, the server identifies the exact sequence of video segments to stream based on the address from which a client requests the video stream. For instance, each video segment in the sequence may be identified in different query string parameters, path information, or other information associated with a request for video content. Or sequence-identifying data may be mapped to the address in a table or other data structure at the server. In a similar manner, from the address, the server may also identify other parameters relevant to the stitching process, such as offsets, segment lengths, header information, and integrity-verification data. In an embodiment, a system may include a link generation component configured to dynamically generate a link, such as a URL, that is suitable for requesting a specific sequence of video segments. Such a link may, for example, be embedded in a web page from which the sequence is intended to be viewed.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 105-170. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Clients

System 100 comprises multiple client devices 110. A client device may also be referred to herein as simply a client or end-user device. A client 110 is a standalone computing device, such as, without limitation, a desktop personal computer, laptop, tablet, smartphone, personal digital assistant, gaming console, set-top box, or multimedia device. A client 110 comprises computing hardware, such as one or more processors, configured to implement video playback of media streamed or downloaded from sources across a network 105, such as from video server 120. For instance, client 110 may comprise a web browser by which client 110 accesses video server 120 over HTTP. As another example, client 110 may comprise a video streaming software application by which client 110 accesses video server 120. Although three clients 110 are depicted, there may in fact be any number of clients 110 in system 100.

2.2. Video Repository

System 100 further comprises one or more server systems 125 coupled to clients 110 by one or more networks 105, such as the Internet. Server system 125 may be, for instance, a server farm, a cluster of computers, a collection of virtual servers, or any other set of one or more computing devices that collectively provide the services described herein.

One function of server system 100 is to facilitate playback of various video segments, or sequences thereof, on clients 110. According to an embodiment, these video segments are distinct units or "clips" of video data stored in one or more repositories 170. Although in one embodiment, each video segment corresponds to a different video file, in other embodiments, the video segments may be stored in files, databases, or any other suitable structure within the one or more repositories 170. For instance, each video segment may be a file encoded in a popular streaming format, such as an MPEG-4 or H.264 encoded MP4 file, WMV file, MOV file, and so forth. Server system 100 may comprise any number of video repositories 170. For instance, there may be one video repository 170 for subscription content such as movies and/or shows, another video repository 170 for advertisements, another video repository 170 for enhanced content, and so forth. Or, all content may simply reside in a single video repository 170. In an embodiment, some or all video repositories 170 may be hosted outside of server system 170.

A video repository 170 may further store descriptive metadata describing each video segment stored therein. For each video segment, the metadata may include, without limitation, a title, description, keywords, ownership data, licensing information, and/or one or more categories of genres. Moreover, in some embodiments, a number of versions of each video segment may be stored in video repository 170 for different contexts, such as different target platforms, different streaming bitrates, and so forth. For instance, there may be both a high-definition version and a low-definition version of each item of video content. The metadata may describe which versions of the video segments exist, and where each version may be found.

The one or more video repositories 170 need not be limited to storing video data and descriptive metadata. In fact, in some embodiments, the one or more video repositories 170 may further store a variety of other data structures, such as temporary metadata used for stitching video segments together, web pages, images, application code, and so forth.

Although usually the various portions of the video segments (i.e. the header block and the video data block) are stored together in a common file or structure, in an embodiment, video repository 170 may store them in separate addressable locations, to reduce the amount of time needed to extract those portions for processes described in subsequent sections.

2.3. Video Server

Among other elements, server system 125 may include video server 120. Video server 120 is configured to send video data, such as stored in one or more video repositories 170, to clients 110. Video server 120 may be a standard web server, an HTTP server specially configured for streaming video, an RTSP server, a customized application server, a customized web application executing on a standard application server, or any other suitable server.

The video data may be downloaded or streamed, depending on the embodiment. As used herein, the act of streaming refers to the sending of sequences of data elements, possibly including only select timespans or portion, from an video source over time, rather than in a batch, in such a manner than the data elements may be utilized immediately upon reception rather than having to wait for the entire video. For instance, the streaming of video data may involve the sending of image frames or data representing groups of image frames from the video data in an order in which the frames or groups are played, so that corresponding portions of the video data may be played immediately upon reception rather than waiting for the entire video data to be transmitted.

In an embodiment, when streaming video, a bitstream, or simply "stream," of the data is delivered from a video server 120 to a streaming client 110 using a transport protocol, such as Microsoft Media Server (MMS) or Real-Time Transport Protocol (RTP). As an alternative to using proprietary transport protocols, in an embodiment, video server 120 streams video over the Hyper-Text Transport Protocol (HTTP) using technologies such as HTTP Live Streaming (HLS), Microsoft's Smooth Streaming, Adobe's HDS, or Dynamic Adaptive Streaming over HTTP (DASH).

In many embodiments, at the network communications level, the act of sending video from a video server 120 to a client 110 may involve many iterations of requests from client 110, each request followed by a response from video server 120 containing a next portion of the video. This is because many communication protocols used for downloading or streaming video are packet-based protocols, wherein a client 110 request a first portion of the video, followed by a second portion of the video, and so on, until the video has been entirely received, or until the client is instructed to stop requesting video (e.g. because a user stopped playback of the video). For instance, the streaming of video via the HTTP protocol may involve an initial HTTP request from client 110, followed by an HTTP response from server 120 that includes video data corresponding to a first range of bytes in the video, followed by another HTTP request for a second range of bytes, followed by another HTTP response that includes video data corresponding to the second range of bytes, and so forth.

These network-level requests and responses are typically linked or otherwise associated by a logical construct referred to herein as a "streaming session," or simply "session." For simplification, this disclosure will sometimes describe the process of sending content at the session level, in terms of "a request" from client 110 and "a response" from server 120. In light of the foregoing, however, it will be understood that this session-level "request" and "response" may involve, at the more technical level, any number of network-level requests and responses. This disclosure may also at times explicitly refer to only the first request and response of a session, with the implication that any follow-on requests and responses needed to complete the sending may also exist.

In an embodiment, video server 120 may be configured to process instructions from a streaming client 110 using a control protocol, such as, without limitation, MMS or Real Time Streaming Protocol (RTSP). Such instructions may include, without limitation, instructions to request new frames, skip a number of frames, seek to a specific enumerated frame or associated timestamp, or stream video data at a seek rate that is different than its playback rate. For instance, video server 120 may be configured to respond to an HTTP request for a specific byte range of a stream by seeking to the specified byte range and beginning streaming from that byte range.

2.4. Video Selection

The video streaming process begins with video server 120 receiving a request to provide video content to a client 110. Typically, but not necessarily, the request is from the client 110 itself. The request may include request metadata in any of a variety of forms. For instance, if the request is an HTTP request, the request may include a URL (including both the address of the video server 120 and separate path information), header information, query string parameters, POST data, cookies, and so forth. As another example, if the request is an Application Programming Interface ("API") function call, the request may include a function name and any number of parameters. The video server 120 may further be configured to use request metadata in the request to look up a variety of other request metadata found in various data stores. For instance, the request may include a session identifier which is used to locate session information stored at the server, such as a user name, tracking data, preferences, and so forth.

Generally speaking, video server 120 uses the request metadata to identify a group of video segments to be returned to the client 110 as a stitched video sequence. In an embodiment, the identification process is relatively trivial, as the request metadata (e.g. the query string or path) includes identifiers for each of the video segments, or an identifier that is mapped to information on the server that identifies each of the video segments (e.g. a table that maps proxy URLs to lists of video segments). This may occur, for instance, when the client 110 sends the request responsive the embedding of a pre-generated video sequence link within a web page being viewed at the client 110, per processes described in subsequent sections. The segment identifiers may identify their corresponding distinct video segments in any suitable manner, including relative or absolute file names and/or directories within file structures in a repository 170, title or other video segment metadata, unique record identifiers, and so forth.

In other embodiments, the request metadata indicates only some or even no identifiers of video segments to return. In these embodiments, video server 120 may communicate with one or more optional video selector components 140 to identify video segments to include in the video sequence. A video selector component 140 may be a set of application or server processes executing within server system 125, or even within video server 120 itself. In an embodiment, one or more video selector components 140 may instead reside outside of server system 125. For instance, a third-party content recommendation service may provide an API by which video server 120 may request recommendations for certain types of video segments to include from repositories 170 hosted by the third-party.

A video selector component 140 may select one or more video segments to include in a video sequence in response to the request. Video selector component 140 may employ a variety of techniques to identify suitable video segment(s) to include in the sequence. For instance, video selector 140 may utilize rules that specify specific items of content that should be shown together in a sequence. Or video selector 140 may compare request metadata to descriptive metadata in video repository 170 to identify one or more items that "best match" the request.

For example, the request may identify a single item of content that the requesting client 110 would like to view, such as a movie or news clip. Video server 120 may request that video selector 140 identify any additional content that should be stitched together with the movie or news clip before returning the requested content. The video selector 140 may be configured with a rule to show a certain copyright notice before the requested content. Video selector 140 may thus return the corresponding identifier for the copyright notice to video server 120, so that it may be stitched in before the requested content. Or, video selector 140 may be configured with a rule that a number of randomly-selected promotional video segments be shown before and after the requested content. Video selector 140 may thus select appropriate promotional video segments and return corresponding identifiers to video server 120. As another example, the request may not actually specify any specific video content to show, and the video selector 140 may select all of the video segments in the sequence based on various recommendation algorithms.

According to an embodiment, video selector 140 is configured with certain global rules, such as to always select at least one promotional video, such as an advertisement or trailer, to show before a "main feature," such as a movie or show, and at least one promotional video to show after the "main feature." More generally, the video segments may classified by types, and the video selector may be configured to select segments for a sequence in accordance to one or more templates, such as ABA or ABACA, where A is one type of segment, and C is another type of segment.

Additional examples of various techniques that may be utilized to select content are described in other sections. However, unless otherwise stated, the inventive techniques described herein may be utilized with any suitable video selection technique(s).

2.5. Video Stitching

Once the video segments to include in the stitched video sequence have been identified, video server 120 works in coordination with video stitcher 150 to return the video segments to client 110 as a single, stitched video. Video stitcher 150 is a set of processes executing within server system 125, or even within video server 120, configured to receive the identities of segments to include in a sequence, and return stitched video contents to video server 120 based thereon.

In many embodiments, the first data to be returned for the stitched video will be a video header. Many types of video files are structured such that they include a video header portion, referred to as a video header block, followed by one or more video data portions, referred to as video data blocks. The video data blocks are usually formatted according to some sort of encoding scheme. The video header block generally includes information necessary to interpret and/or decode the encoded video data. For example, in certain formats, the video header may include information such as offsets at which certain subportions of the video data, known as "chunks," may be found. The video header may further include data indicating what type of coding was used for a given chunk, as well other information necessary to interpret the given chunk. Other examples of types of information that may be found a video header include, without limitation, sample-to-chunk mappings, sample descriptions, sample-to-timestamp mappings, random access point markings, content durations and timescales, edit lists, and so forth.

For the stitched video header, the different headers of the video segments within the sequence are extracted from their respective segments, and then merged together to form a single combined video header for the entire sequence. The process of generating this stitched video header is also referred to herein as header transcoding. The exact steps involved in transcoding the header will vary from embodiment to embodiment and format to format. In some embodiments, for example, the process involves a variety of merger steps, such as adjusting timestamps and/or chunk byte offsets for each segment to take into account the relevant sizes of any segments in the sequence prior to the segment. Additional examples of header transcoding are described, without limitation, in subsequent sections.

Header transcoding may be performed by a metadata generator component 160 of server system 125. Though depicted as logically separate from video stitcher 150, it will be appreciated that metadata generator 160 may instead be part of video stitcher 150. Metadata generator 160 accepts, as input, the identities of segments in a sequence, as well as the order in which the segments are to be shown. Based on this information, metadata generator 160 may locate the relevant video segments and, based thereon, generate various metadata necessary for the stitching process, including the stitched video header. Metadata generator 160 may return this header to video stitcher 150 and/or save the header for subsequent re-use.

In addition to generating the stitched video header, other metadata generated by metadata generator 160 may include, without limitation, a list of byte offsets within each segment at which the segment's video data block may be found, and a list of lengths of each segment's video data block. In some embodiments, such metadata may be stored for subsequent reference in, for instance, a sequence metadata file.

In certain embodiments, such as described subsequently with respect to FIG. 2, the video header and other necessary stitching metadata will have already been generated, in which case video stitcher 150 accesses the stitching metadata without needing to communicate with metadata generator 160.

Upon returning the video header, video stitcher 150 continues the stitching process by reading the first video segment in the sequence from the repository 170. The video stitcher 150 extracts the video data block of the first video segment and returns it to video server 120, which serves the video data block of the first video segment immediately following the stitched video header. Once the video data block of the first video segment has been served, video stitcher 150 reads and extracts the video data block of the second video segment, and the video server continues by serving the video data block of the second video segment. The process continues until all video segments in the sequence have been served (or until the client 110 stops requesting content).

Figure 3:
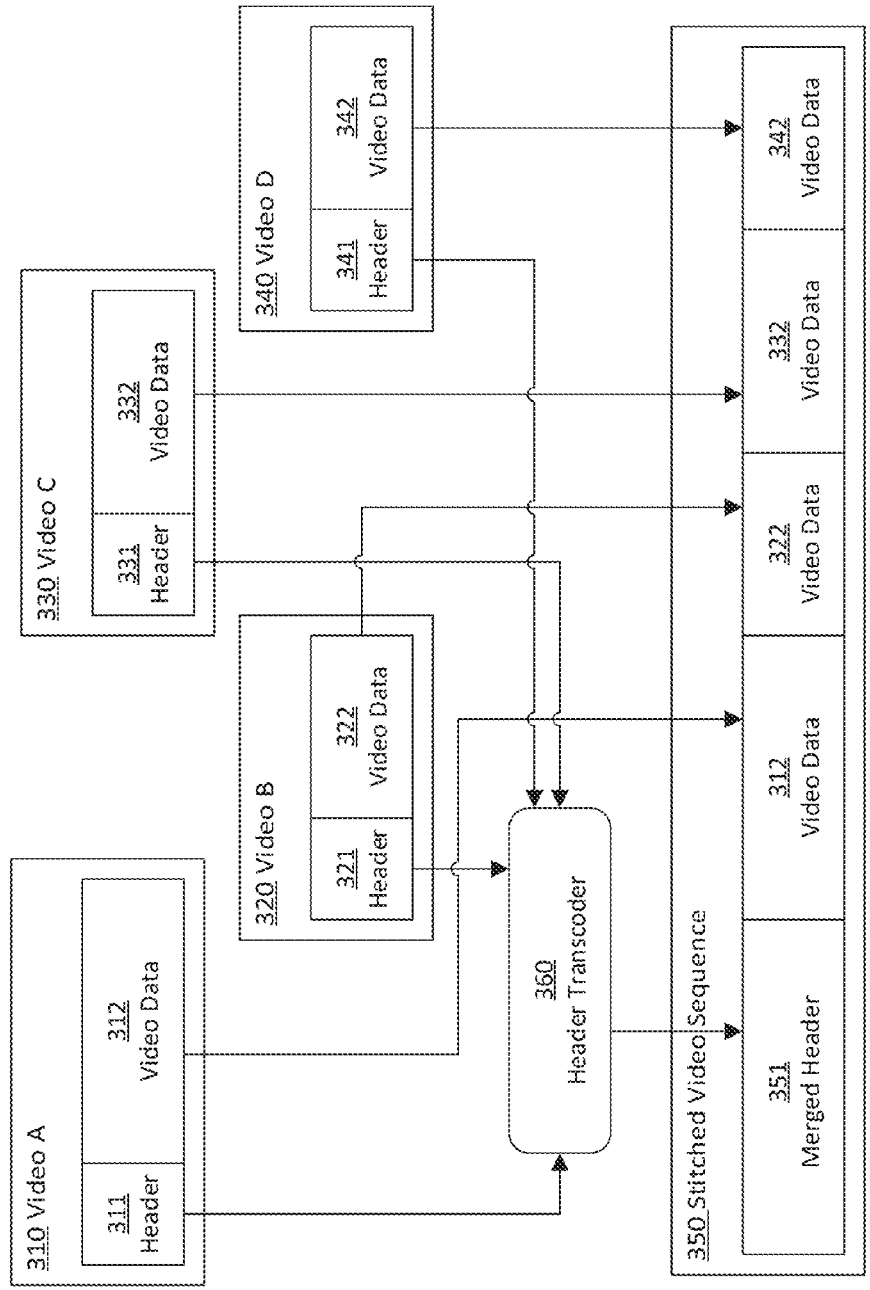
FIG. 3 illustrates the utilization of the video stitching process on an example set of video segments.

FIG. 3 illustrates the utilization of the video stitching process on an example set of video segments, according to an embodiment. In FIG. 3, four video segments, labeled 310, 320, 330, and 340, have been selected for inclusion in a stitched video sequence 350, in the listed order. Each video segment includes a header block—namely headers 311, 321, 331, and 341, respectively—as well as a video data block—namely video data blocks 312, 322, 332, and 342, respectively. To stitch these video segments together, the headers 311, 321, 331, and 341 are extracted from their respective segments, and then processed by a header transcoding component 360, such as may be found in metadata generators 160 and 260. The header transcoder component 360 merges headers 311, 321, 331, and 341 into a single merged header 351, which is delivered as the first portion of the stitched video 350. The next portions of stitched video sequence are extracted directly from the video data blocks of the video segments, without further manipulation. Hence, video data 312 is extracted from video segment 310 and sent as the second portion of the stitched video 350. Video data blocks 322, 332, and 342 are likewise extracted from their respective video segments, in turn, and delivered as the third, fourth, and concluding portions of the stitched video 350.

It will be noted that, as a result of the dynamic stitching process described herein, the complete stitched video sequence need not necessarily ever be stored in a single file or other structure at the server system 125, even though it may appear to the client 110 that such a file or other structure exists. For instance, while the processes described herein may result in stitched video 350 being streamed, in full or in part, to a client 110, the server system 125 may only actually store video segments 310-340, and not stitched video 350. Thus, the server system 125 may dynamically generate and serve virtually endless permutations of video segment sequences from the video segments stored in video repository 170, with little to no additional overhead in terms of storage and processing resources.

2.6. Streaming Sessions

As previously mentioned, the sending of a stitched video segment may occur over the course of a "session" of multiple network-level requests and responses. In an embodiment, during such a session, clients 110 may "skip" forward or backwards in a stitched video sequence by requesting that the video server 120 jump to (or begin streaming) at a certain byte range in the sequence. For instance, if the HTTP 1.1 protocol is used, video server 120 may support byte range serving to allow, in essence, random access to specific parts of the stitched video.

In such embodiments, the video server 120 (or stitcher 150) may be configured to use segment length and offset information, such as generated by metadata generator 160, to locate the video segment to which the requested byte range corresponds, as well as a specific position within that video segment that corresponds to the requested byte range. The video server 120 may begin streaming the identified video segment from that position, without necessarily needing to serve or read any preceding segment, or even any chunks of the identified video segment that proceed the identified position. Similar techniques may be used to fast-forward, rewind, and/or perform other trick-play operations on the stitched sequence.

Figure 4:
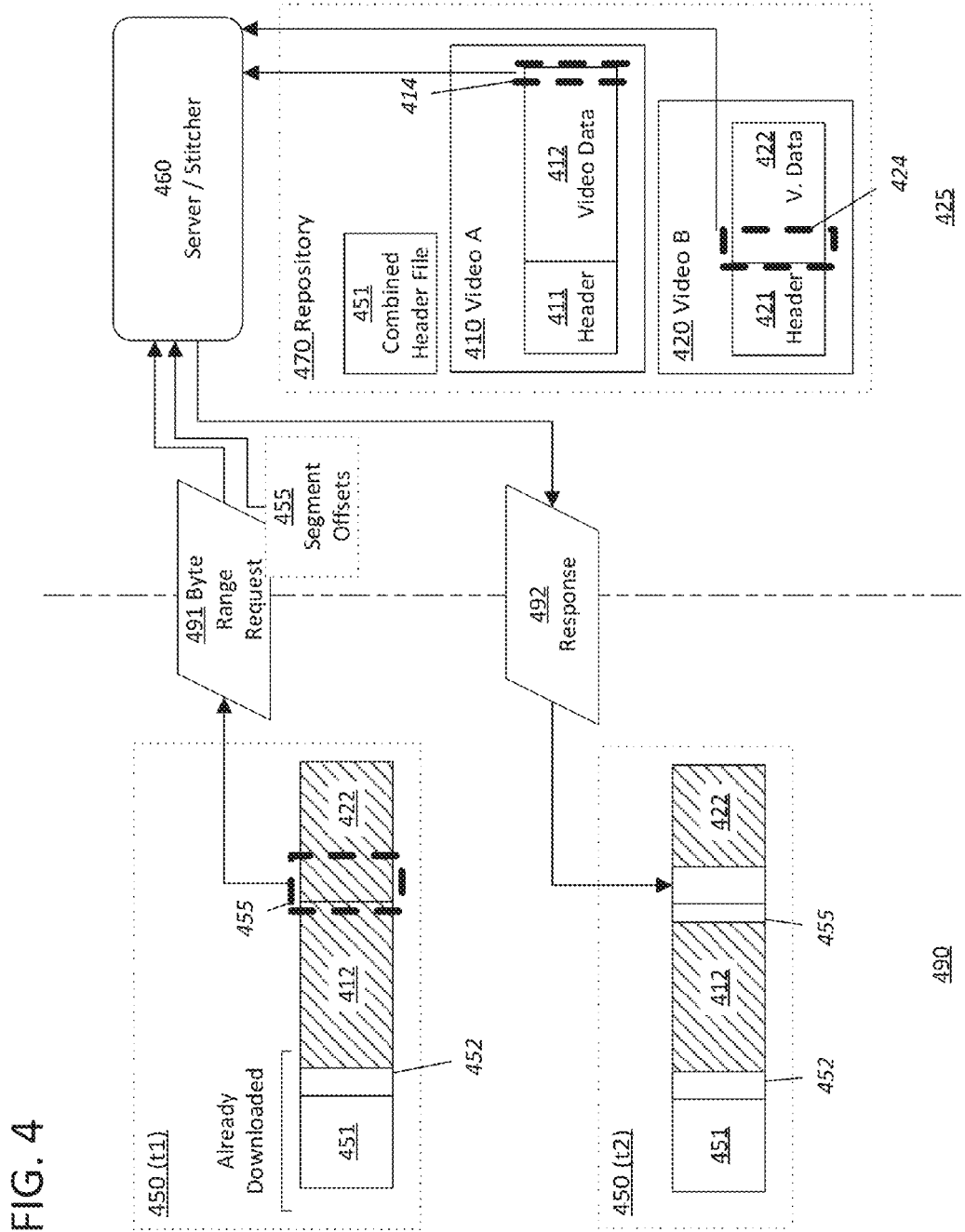
FIG. 4 illustrates the use of a byte range request to access a specified portion of a stitched video sequence.

FIG. 4 illustrates the use of a byte range request to access a specified portion of a stitched video sequence, according to an embodiment. In FIG. 4, a server system 425 is sending a stitched video 450 to a client 490. Server system 425 includes a repository 470 that stores, among other structures, video segments 410 and 420. Video segment 410 comprises a header 411 and video data block 412, while video segment 420 comprises a header 421 and video data block 422. A combined header file 451 has been generated for the stitched video sequence 450, and may optionally have also been stored in repository 470 or some other location within server system 425.

The state of stitched video 450 with respect to client 490 is depicted from two points in time—t1 and t2. For illustrative purposes, video data blocks 412 and 422 are both depicted within video sequence 450, even though client 490 may not necessarily be aware of the fact that video data blocks 412 and 422 actually exist. Rather, from the perspective of client 490, the stitched video 450 simply comprises a header 451 and a single video data block spanning both video data blocks 412 and 422. Moreover, only parts of the stitched video 450 have actually been received at t1 and t2. The parts that have yet to be received at a given time are indicated by pattern fill.

At the time depicted within FIG. 4, downloading or streaming of the video sequence 450 has already commenced, with the client having already received combined header 451 and a subset 452 of video data 412. At t1, the client 490 has been instructed to skip to a certain timestamp within the stitched video 450. Client 490 therefore identifies a byte range 455 within the stitched video corresponding to this timestamp and sends a request 491 for the video data at that byte range. Note that the byte range 455 is not contiguous with the downloaded subset 452, and as a result, the content of video data 412 between subset 452 and byte range 455 will not be downloaded. Also, byte range 455 overlaps video data from both video segment 410 and video segment 420. The client 490, however, does not need to be aware of this fact, as the server will stitch the contents together seamlessly in a manner that is transparent to the client 490.

A server and/or stitcher component 460 (herein after server 460) receives and processes the byte range request. The server 460 locates stitching metadata 455 for the sequence, either within the byte range request 491 (e.g. as query parameters) or stored within the server system 425. With this stitching metadata information 455, the server 460 identifies not only which video segment(s) contain byte range 455, but also specific addressable locations within those video segments that correspond to the byte range 455. Specifically, server 460 identifies the byte range 455 as corresponding to a subset 414 of video data 412 followed by a subset 424 of video data 412.

Server 460 reads the subsets 414 and 424, concatenates them together, and sends them back to the client 490 in a response 492.

For instance, suppose bytes 21000-22000 were requested from the sequence. Also suppose that stitching metadata indicates that the length of video data 411 is 21500, that the offset of video data 411 relative to video segment 410 is 1000, and that the offset of video data 421 relative to video segment 420 is 1500. Server 460 would thus determine subset 414 to be bytes 22000-22500 of video segment 410, and subset 424 to be bytes 1500-2000 of video segment 424. Server 460 could then just return the video data directly from these bytes.

At t2, the response 492 has been received. Consequently, byte range 455 is now depicted as having been received within stitched video 450.

In certain embodiments, it may be necessary for video server 120 to return certain state data to clients 110 in such a manner that the clients 110 will send the state data back to video server 120 in subsequent requests. This state data may be utilized by video server 120 and/or video stitcher 150 to locate session information for the client 110, including the identities of the segments being stitched, any previously generated stitching metadata, and/or the current progress of the streaming, if necessary. The use of state data may be particularly useful in embodiments where the stitched video will be streamed over multiple iterations of requests and responses, and where video server 120 requests that video selector 140 dynamically select segments for the sequence, as otherwise video server 120 may select a different set of video segments for the sequence each time a client requests a next portion of the sequence.

2.7. Link Generator

Figure 2:
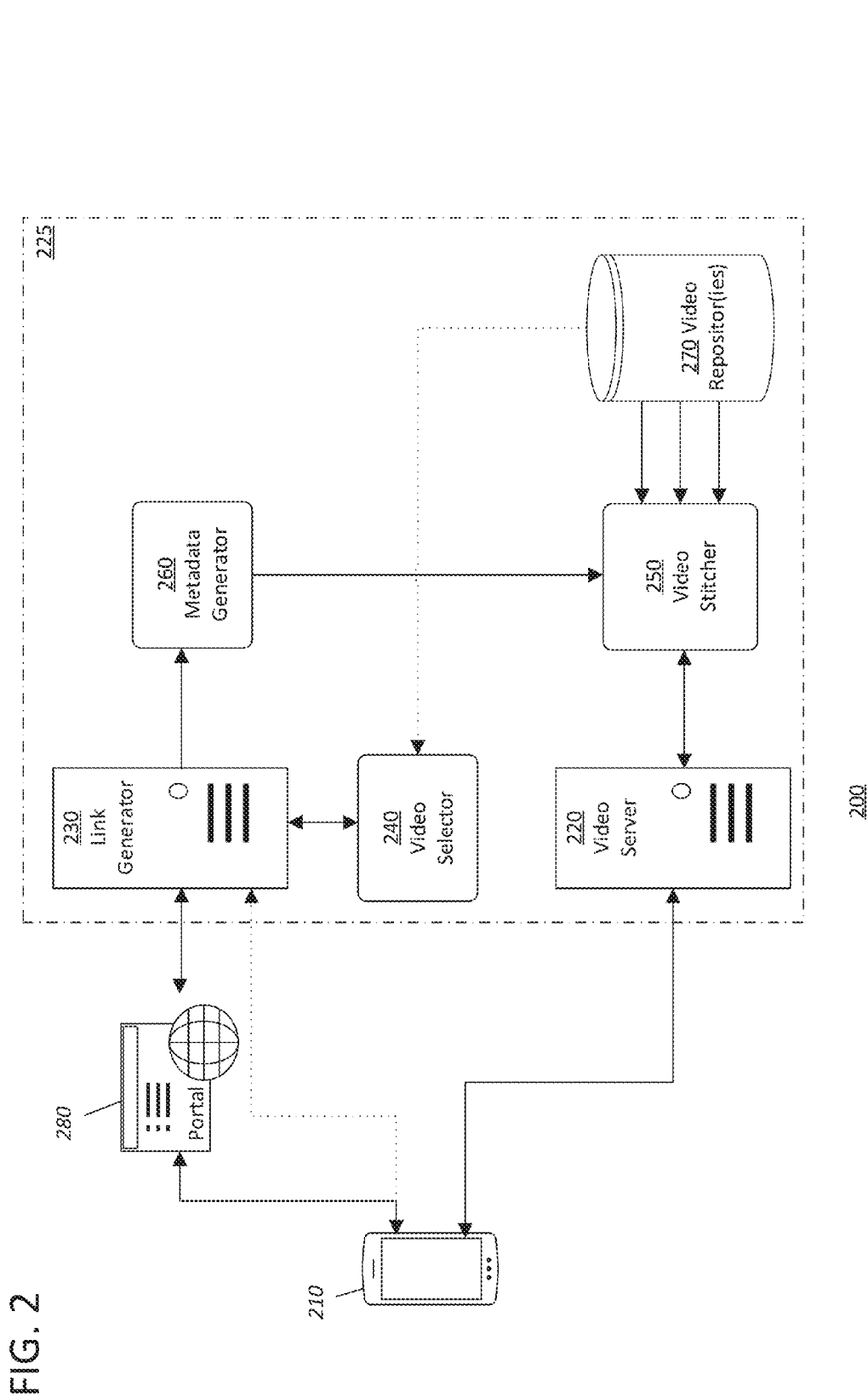
FIG. 2 is an illustrative view of various aspects of an example system in which links for stitched video sequences are generated prior to clients requesting the sequences.

FIG. 2 is an illustrative view of various aspects of an example system 100 in which links for stitched video sequences are generated prior to clients requesting the sequences, according to an embodiment. System 200 comprises one or more computing devices, in similar arrangement to those of system 100. In fact, similar to system 100, system 200 may comprise one or more clients 210, video servers 220, server system 225, video selectors 240, video stitchers 250, metadata generators 260, and video repositories 270, corresponding respectively to clients 110, video servers 120, server system 125, video selectors 140, video stitchers 150, metadata generators 160, and video repositories 170.

System 200 further includes one or more link generator components 230. A link generator 230 is responsible for pre-configuring server system 225 to serve specific stitched video sequences to specific clients 210, and returning links by which the specific clients 210 may access the specific stitched video sequences. Link generator 230 may do so in response to requests from any of a variety of requestors. For instance, link generator 230 may expose one or more APIs by which a client-side application on client 210, or an intervening web or application server, may request a link for a sequence of video segments. The generated links may be, without limitation, Uniform Resource Locators (URLs), Uniform Resource Identifiers (URIs), or any other suitable type of address by which a client 210 may uniquely reference the stitched video sequence that link generator 230 preconfigured in response to the request. In an embodiment, the link may include an address for video server 220, though in other embodiments the address may of the video server 220 may be implied (e.g. a relative link).

In an embodiment, client 210 accesses at least certain stitched video sequences by first requesting a web page from a portal 280. The client 210 may navigate to the web page for a variety of reasons. For example, the user of the client 210 may have clicked on a link to the web page to request a certain movie or video playlist. Or, the web page may be a general landing page for the portal 280, and different content may be selected for display depending on the context. The portal 280 may be hosted by server system 225 (e.g. by a same web server that hosts the video server 240 and/or link generator 230), or by an entirely different third-party system. In an embodiment, clients 210 may access stitched video sequences from system 225 through any number of different portals 280. In any event, portal 280 is configured to make an API call to link generator 230 requesting a link to embed within a web page being generated by portal 280. The API call may include, in its parameters, any suitable request metadata described herein.

In an embodiment, such an API call may originate directly from the client 210. For instance, a mobile application installed on the client may be configured to communicate with link generator 230 to identify a URL via which the mobile application may retrieve a stitched video sequence. In an embodiment, certain functions of the link generator 230 may even be shifted to the mobile application instead of the server system 225. In yet other embodiments, the request may be a conventional HTTP request from a web browser on the client 210, and the generated link may be returned by way of redirecting the client 210 to the stitched video stream.

Among other pre-configuration activities taken in response to receiving the request, link generator 230 may identify video segments for the sequence based on request metadata, in similar manner as described with respect to video server 120 above. Link generator 230 may further communicate with video selector 240 to accomplish this task. In an embodiment, the link generated by link generator 230 will include identifiers for each video segment in the sequence, such as within the query string and/or the path of the link. Each identifier may be, for instance, a file name or record identifier. The identifiers may or may not be encrypted. In an embodiment, the identifiers for some or all of the video segments may instead be stored within a database of server system 225, and mapped to a unique sequence identifier. The sequence identifier may be included in the link instead of the identifiers for the video segments.

Link generator 230 may also communicate with metadata generator 260 to request the generation of various stitching-related metadata, such as the combined video header for the sequence, segment offset and length data, and so forth. The video header may then be stored within a file system or other repository at the server system 225. Similar to the video segment identifiers, an identifier for the video header, such as a file name or record identifier, may then be included within the link. Or, the video header may be stored in association with a sequence identifier, and the sequence identifier may be included in the link. Likewise, some or all of the generated metadata may be embedded in the link and/or stored in association with a sequence identifier.

According to an embodiment, when utilized in association with link generator 230, metadata generator 260 may also generate a checksum or other integrity-verifying data to include in the link, as described in other sections.

2.8. Miscellaneous

Systems 100 and 200 illustrate only one of many possible arrangements of components configured to provide the functionality described herein. Other arrangements may include fewer, additional, or different components, and the division of work between the components may vary depending on the arrangement. For instance, while video selector 140 is described as selecting the number and types of content to include in a sequence, video server 120 may actually select the number and/or types, and video selector 140 may simply be charged with selecting a specific item of a specific type requested by video server 120, as needed. In some embodiments, video selector 140 and/or metadata generator 160 may be omitted, along with any other components relied upon exclusively by the omitted component(s).

Similarly, FIG. 3 and FIG. 4 are intended for illustrative purposes only. The exact sizes of headers, video data blocks, and byte ranges relative to each other will typically be quite different than depicted. For instance, the headers are typically much smaller relative to the video data blocks than depicted in FIG. 3 and FIG. 4. Moreover, stitched videos may be made from any number of video segments, not just the numbers depicted therein. In some embodiments, headers may be distributed across multiple locations in a file, and not necessarily at the beginning of a file.

Moreover, in at least one embodiment, video segments may be in a headerless format, in which case no header is included in the stitched video. Any corresponding processes described herein with respect to a header may therefore be omitted for videos that have a headerless format.

3.0. Functional Overview

In an embodiment, the delivery of stitched sequences of video segments is greatly enhanced using server-side techniques that transcode only the header portions of the video segments and send the video data blocks of the video segments without manipulation. In an embodiment, the dynamic selection of sequences to deliver may also or instead be greatly simplified by a pre-configuration process that prepares the server to deliver a sequence of video targeted for a specific client.

3.1. Serving Stitched Video Sequences

Figure 5:
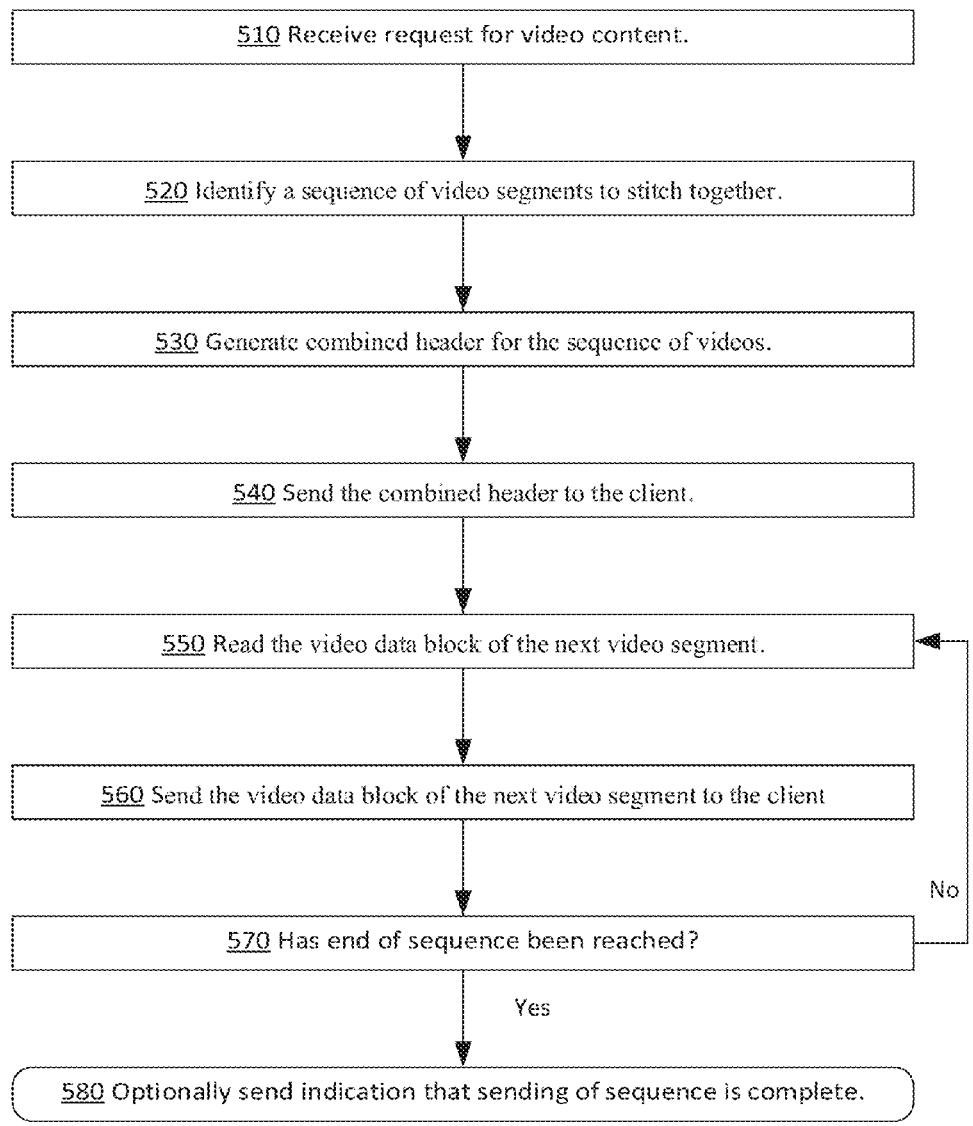
FIG. 5 illustrates an example flow for stitching a sequence of video segments.

FIG. 5 illustrates an example flow 500 for stitching a sequence of video segments, according to an embodiment. The various elements of flow 500 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 500 illustrates but one example flow for serving a stitched video sequence. Other flows may involve additional or fewer steps, in potentially varying arrangements.

Block 510 comprises receiving a request for video content. The request may take a variety of forms. For instance, the request may be an HTTP request to download or stream content. The request is from a client, such as client 110, and received at a video server, such as video server 120 or 220. The request is addressed to the video server. For instance, the request may specify a domain name and/or IP address of the video server, an application identifier. The request may further include a variety of other request metadata, as described in other sections. In an embodiment, the request may have been redirected to the video server via, for instance, a proxy server or other intervening server configured to manipulate URL information the request and/or other request metadata.

Block 520 comprises identifying a sequence of video segments to stitch together. In some embodiments, the request of block 510 may actually include information identifying at least one of these segments. For instance, the request of block 510 may specify, in a query string or any other suitable parameter-specifying mechanism, a title, address, or other content identifier for a movie or show that a user is requesting. In some cases, the entire sequence may be specified by the request.

In other embodiments, block 520 comprises dynamically selecting at least one, or even all, of the video segments in the sequence. Video segments may be selected from one or more libraries, catalogs, or other repositories of available video segments at random and/or based on any of a variety of factors. As a result of dynamic selection, for instance, the server may respond to different requests for the same item of video content by returning different sequences of video segments.

Video segments may be selected based on factors such as how recently the video segments were generated (e.g. in the case of breaking new story) or amounts of compensation associated with displaying the video segments to a user. Or, a video segment may be selected based on historical information, such as how many users viewed the video segment over a period of time (e.g. a "trending" video), or how many viewers viewed another segment for which the selected segment is a "preview" or "teaser."

As another example, video segments may be selected based on contextual information associated with the request. The contextual information may include, in some embodiments, the identity of a specific item of video content being requested. For instance, the requested item may be associated with a set of accompanying video segments. Various metadata associated with the specific item, such as genre, series name, keywords, ratings, actors, directors, release date, tags, and so forth, may also be utilized to identify or add to a set of accompanying video segments.

Video segments may also or instead be selected based on the identity of a user associated with the request. For instance, user credentials may be included in the request or in associated cookie and/or session information. The user identity may be used to locate historical information associated with the user, such as previously viewed videos, browsing histories, purchase histories, click-through histories, and so forth. Or the identity may be used to locate demographic information or explicit preferences associated with the user. Further examples of contextual information may include, without limitation, client type, device type, user agent, screen size, network service provider, time, date, and so forth.

In an embodiment, different contextual information may be associated with different accompanying video segments. For instance, a database may map certain requested movies or shows to specific content that should or may accompany the requested movies or shows. The entire set of accompanying video segments may be shown with the requested item, or the sequence may be constructed by randomly or intelligently selecting from this set.

In an embodiment, more sophisticated selection mechanisms may be utilized, such as bidding engines and/or machine learning functions based on the contextual information and/or the historical information, including ranking functions that weight associations between particular types of contextual information and particular segments. The techniques described herein are not limited to any specific selection process.

According to an embodiment, some or all of the video segments may be selected by another application or server instead of the first server. For instance, the first server may send contextual information gathered from the request to an external content selection server, which utilizes any suitable selection technique to identify video segments to include in the sequence.

Block 530 comprises generating a combined header for the sequence of videos. The combined header contains a valid header for the entire video sequence as if each video in the sequence were stitched together into a single video file. Generating the combined header may involve a variety of steps, depending on the embodiment. The exact steps used will depend on the embodiment and/or encoding formats of the video segments in the sequence.

As a non-limiting example, for certain video formats, generating the combined header for a stitched video may involve locating and extracting or otherwise reading the header portions of each video segment identified in block 520. The different sections of each header file, such as chunk offset listings, edits lists, sample-to-chunk mappings, and so forth, are parsed in turn and merged together with the corresponding sections of each other header file. For instance, the chunk offset listing of each individual video segment may be concatenated to the chunk offset listings of each other individual video segment to form a single chunk offset listing. Sample listings and/or other types of tables, listings, or mappings may also be concatenated together. As these sections are merged, any byte addresses and/or timestamps described in a segment's header may be incremented by an amount corresponding to the length (in bytes or time, respectively) of any segments preceding the video segment in the sequence. Any summary statistics for the combined header, such as total size or duration of the sequence, are recalculated by summing the corresponding statistics in the individual headers.

Block 540 comprises sending the combined header to the client. For instance, the combined header may be embedded within the payload of an HTTP or RTSP response packet, or sent via any other suitable communication mechanism. The combined header may form part of a video stream, or part of a downloadable file, depending on the embodiment.

Block 550 comprises locating and extracting or otherwise reading the video data block of the next video segment in the sequence. If block 550 is being performed for the first time in flow 550, the next video segment is the first video segment. Only the video data block of the segment need be read—in other words, the header can be ignored or discarded.

Block 560 comprises sending the video data block of the next video segment to the client. Again, the video data block may be embedded within the payload of one or more packets, as either part of a stream or a downloadable file. Note that block 560 may in fact be performed, in full or in part, at the same time as block 540 and/or other iterations of block 560. For instance, the header and at least a subset of the video data block for the current video segment may be transmitted in a single packet. Or, the entire stitched sequence may be transmitted at the same time. Moreover, in some embodiments, block 560 (and potentially block 540) involves receiving a number of requests for additional data from the client over time. For instance, after receiving and interpreting an initial response from the server, the client may send a request for a next certain number of bytes of the video sequence. Once the server has delivered that number of bytes, the client may send another request for the certain number of bytes, and so forth.

Once the end of the current video segment has been sent, flow proceeds to block 570. Block 570 comprises determining whether the end of the sequence has been reached. If so, then flow proceeds to block 580. Otherwise, flow returns to block 550.

At block 580, flow 500 terminates. The server may optionally send an indication that the end of the sequence has been reached. For instance, the server may include metadata in the last response packet sent in the last iteration of block 560 that indicates that there is no more data remaining in the video sequence. Or, the server may send a message interpreted by the client to signify that an end of file has been reached. Or, the indication may be implicit, in that the server simply does not send any further video data to the client.

3.2. Pre-Configuring the Video Server

Figure 6:
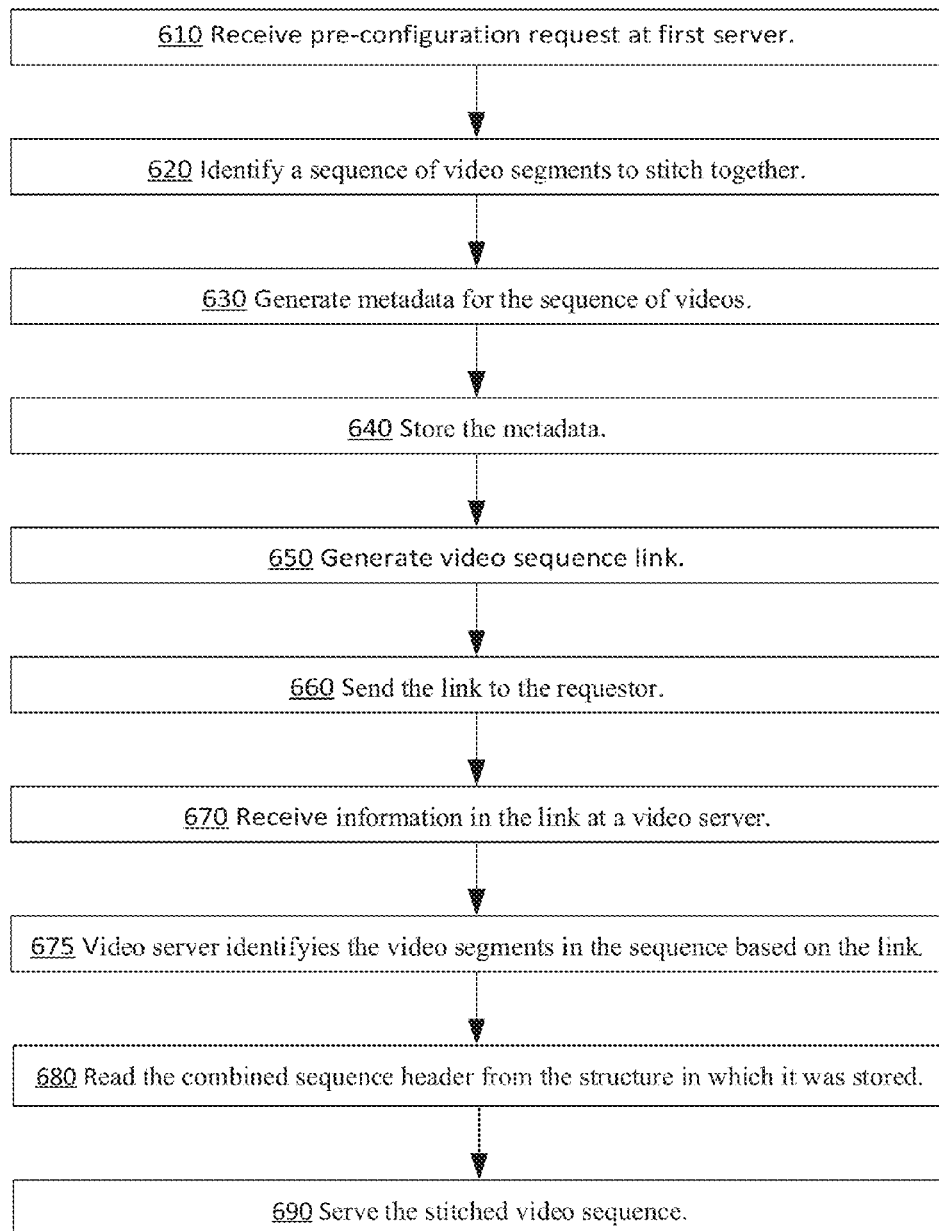
FIG. 6 illustrates an example flow for stitching a sequence of video segments, involving an initial step of pre-configuring the server to stitch the sequence.

FIG. 6 illustrates an example flow 600 for stitching a sequence of video segments, involving an initial step of pre-configuring the server to stitch the sequence, according to an embodiment. The various elements of flow 600 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 600 illustrates but one example flow for serving a stitched video sequence that involves the pre-configuration of the server. Other flows may involve additional or fewer steps, in potentially varying arrangements.

Block 610 comprises receiving a pre-configuration request at a first server. For instance, block 610 may entail link generator 230 receiving a request for a link to a video sequence. The request of block 610 may take a variety of forms, depending on an embodiment.

For example, the request may be a request from an application or application server, such as portal 280, for a link to video content. For instance, the first server may be a specialized server or execute a specialized application for generating video links. The first server may expose a custom Application Programming Interface ("API") by which requestors may make function calls that, such as among other calls, a request to return a link to video content. Additionally, or in the alternative, the API may support a request to return a number of parameter values or other data structures based upon which the requestor may calculate or otherwise generate its own link for video content.

One example of such a requestor may include, for instance, a web application that is generating a web page in which one or more videos are to be presented. The web application may also be executed by the first server, or may be executed by an entirely different server, potentially operated by an entirely different entity than the first server. For instance, the web server may be operated by a network service provider, whereas the first server may be operated by a content distributor with which the network service provider has a contract for delivering content. Another example of such a requestor may be a client-side application, such as a mobile application installed on a smartphone via an app store. The user may have navigated to a page hosted by the web server or the client-side application in the expectation that the user will be able to view a specific movie title, news article, or other item of video content. This item of video content may subsequently be stitched with one or more other video segments via flow 600. Or, the web server or client-side application may provide a general landing page or screen, to which the user navigated without any expectation of viewing a specific item of video content.

The request may instead be a request from a client for an actual video stream, in response to which an instruction that redirects the client to an address for the video stream will be returned. That is, the request may be an HTTP request intended to direct a web browser directly to a video stream rather than to a landing page. The first server may be configured to redirect the web browser to an appropriate address for a stitched video in response to the request.

Block 620 comprises identifying a sequence of video segments to stitch together. Block 620 is performed in similar manner to block 520 above. Note that, since the request of block 610 may come from an intermediary such as a third-party server or application, the intermediary may utilize the request metadata to interface with the first server to influence or even specify some or all of the segments that will be selected.

Block 630 comprises generating metadata for the sequence of video segments. Generating the metadata may comprise, for instance, generating the combined header as described with respect to block 530. Generating the metadata may also comprise generating length information for each segment's video data block, which effectively indicates the position of each segment within the video sequence. Additional metadata may also be generated, such as offset information, integrity verification data, or any other stitching metadata described herein.

Block 640 comprises storing the metadata. The metadata may be stored in a variety of forms. For instance, the metadata may be stored in a database under a record associated with a sequence identifier. Or, the metadata may be stored as one or more files. In one embodiment, a header file is created to store the combined header, while an offset file is created to store segment lengths and offsets for their respective video data blocks.

Block 650 comprises generating a video sequence link. The link may be, without limitation, a URL, URI, or any other suitable type of address or identifying information by which a client may uniquely reference the stitched video sequence. The exact form of the video sequence link will vary depending on the embodiment. For example, block 650 may involve building a query string that includes a separate parameter identifying each segment in the sequence. The query string may also include various sequence metadata, such as video data block offsets and lengths. The query string may also include a parameter identifying the location at which the combined header file is stored.

In yet other embodiments, the link need not comprise any of the generated metadata or even segment identifiers. Rather, the link may simply comprise some sort of segment identification data, such as a unique identifier, to which the segment identifiers and generated metadata is mapped. Examples of suitable links are given, without limitation, in other sections.

Block 660 comprises sending the link to the requestor. Once the link has been returned to the requestor, the requestor may take any of a variety of actions with the link. In an embodiment, the requestor embeds the link within a display of some kind at the client. For instance, if the requestor is a web application, the link may be designated as the source of an HTML5 video tag or video plug-in object.

The exact manner in which the link is utilized by the requestor is significant only in so much that, as a result, in block 670, the information in the link is transmitted to a video server, such as video server 120 or 220. For instance, a user may click on a control within the web page that causes the client to make an HTTP request addressed to the link. Or, a web browser may automatically send a request for the link upon loading a web page in which the link is embedded. Again, is not significant how the link is transmitted to the video server, so long as the video server receives some kind of request from the client that includes the information in the link.

In an embodiment, the first server is different from the video server. For instance, the video server may be a cluster of video streaming server devices, while the first server may be a separate web application server. In an embodiment, the video server may be the same server as the first server. For instance, a server may execute first application code for performing blocks 610-660, and a separate video streaming application for executing the remaining steps of the claim.

Block 675 comprises the video server identifying the video segments in the sequence based on the link. Depending on the form of the link, this may comprise parsing identifiers for the segments from the link, or looking up the identifiers in a table or other data structure using a sequence identifier in the link.

Block 680 comprises locating and reading the combined sequence header from the structure in which it was stored in block 640. Again, depending on the link, this may comprise finding a file name or other address for the stored sequence header within the request metadata, or determining the file name or address using a sequence identifier in the link.

Block 690 comprises serving the stitched video sequence, using steps such as described in blocks 540-580 of FIG. 5 and/or elsewhere herein.

3.3. Skipping Portions of the Stitched Sequence

Flow 500 is described in such a manner that the entire stitched video sequence is served from beginning to end. However, in many cases, the video server may not serve the entire stitched video sequence. For instance, the client may stop requesting the stitched video sequence at any time during performance of blocks 540-560 of FIG. 5, if the user decides to interrupt the stream or download before it is finished. As another example, particularly in the case of streaming the stitched video content, portions of the stitched video sequence may be skipped.

For instance, at any time during performance of blocks 540-580, a client may send a request to the video server requesting that the video server skip content within the stitched video sequence. In some embodiments, the request may specify an amount of time to skip. In other embodiments, the request may be a byte range request that specifies a specific byte range to return to the client, wherein the byte range is not contiguous with the bytes of the stitched video sequence that video server most recently sent to the client. In these cases, the video server locates the segment offset and length information calculated for the sequence and uses it to identify and jump to a specific location in a specific video segment, from which the video server will resume streaming video data. Similar techniques may also be used to skip or seek backwards in the stream.

For these and other reasons, the video server described herein may be characterized as serving at least a portion of a stitched video sequence rather than always sending the entire stitched video sequence.

3.4. Variations

While flows 500 and 600 describe flows in which it is assumed that video stitching will be performed, in other embodiments, the flows may include an optional step of, after receiving the request of block 510 or 610, determining whether video stitching is actually required for requested video content. For instance, a content distributor may provide a certain video segment without requiring that the user view an advertisement, and thus return a link directly to the certain video segment instead of continuing with the rest of flow 600. The determination may be made randomly, based on the current time or date, based on a subscription level associated with a client or user for whom the content is being requested, based on the content itself, based on whether the first server has sufficient resources available to perform the stitching, or based on any of a variety of other pre-conditions.

4.0. Implementation Examples

4.1. Example Links

In one embodiment, a pre-generated link to a video sequence may take the form of:

http://<video-server_address>/<path>/
  <video1_filename>?stitch=
  1&off1=<video1_offset>&len1=<video1_
  length>&v2=<video2_filename>&off2=
  <video2_offset>&len2=<video2_length>{&vn=
  <videon_filename>&offn=<videon_offset>&lenn=
  <videon_length> . . . }&vh=<combined_
  header_filename>&md5=<integrity_verification_
  data>&<other_options>

An example link in this format may be, for instance:

http://videoserver.com/fad6_w_2.npA.3gp?stitch=
  1&v1=81b8_w_2.3gp&v2=1c44_w_2B_.3gp&off1=
  8021&len1=518653&off2=21056&len2=
  1442852&md5=XXXX
  XXXX&c=1054681417_985220980&u=none&s=none Note that the first video segment is listed in the path of the link, whereas the remaining video segments are listed in the query string. In other embodiments, all segments could be listed in the query string. However, the above technique allows, in certain embodiments, the video server to return at least the first video segment from the sequence if for some reason the query string is cut off. In such embodiments, it may be desirable to choose a first video segment that the content distributor most wants the client to see, such as an ad clip.

As another example, in another embodiment, the link information may be embedded with the path of the link, such as follows:

http://<video-server_address>/<path>/stitch=1/
  off1=<video1_offset>/len1=<video1_length>/
  v2=<video2_filename>/off2=<video2_offset>/
  len2=<video2_length>/
  vh=<combined_header_filename>/
  md5=<integrity_verification_data>/<other_options>/
  <v1>

Of course, there are a wide variety of other ways in which the above information may be represented or referenced in a link, and the techniques described herein are not limited to any particular manner of constructing a link. For instance, the above examples assume the link will be an HTTP URL, yet other protocols may be used, and the link need not necessarily even be a URL. Moreover, the link need not specify parameters at all, but rather simply include sequence identifying information by which equivalent information may be located.

4.2. Proxy Server

According to an embodiment, the video server described herein expects to receive segments identifiers and/or certain stitching metadata via the URL received at the video server. However, for various reasons, it may be undesirable to include this information directly in the URL provided to the client. Accordingly, two URLs may be assigned to the sequence—an extended URL in which the various identifiers and/or request metadata are included within the URL, and another shortened version of the URL. The shortened version of the URL may refer to or be intercepted by a proxy server, deployed between the client and the video server. This proxy server may then lookup or generate the extended version of the URL based on the shortened version, and rewrite or redirect the request to the video server accordingly. The video server then processes the request and returns the relevant data either directly to the client or through the proxy server.

4.3. Cache

According to an embodiment, some or all of the stitched video sequences may be sent multiple times to the same and/or different clients. In such embodiments, some or all of the video sequence links may be cached in a memory and re-used. Thus, after identifying the sequence in block 620, a link generator may perform a step of checking the memory to determine whether a valid link for the sequence is already stored in the memory. If so, then the link is returned, and flow 600 may skip to block 670.

4.4. Link Integrity Verification

In an embodiment, a link to a stitched video sequence may include a checksum or other integrity verification data. For instance, link generator 230 may request that metadata generator 260 generate integrity verification data that can be included in the link. This may be particularly desirable where video segment identifiers are transmitted in unencoded form over the link, because otherwise it may be relatively easy to manipulate the link (and therefore the video sequence) in unintended ways. For example, one may be able to reverse-engineer a direct link to a video segment rather than the sequence as a whole, thereby bypassing the video stitching. A portal 280 may, for instance, manipulate the link before embedding the link in a web page, such that commercial segments are omitted from the sequence. Or, a bad actor may attempt to make the video server stitch together sequences of video segments that the video server would normally not stitch together, thereby bypassing licensing restrictions, or even forming denial-of-service attacks.

In an embodiment, the integrity-verifying data is computed based on a hash or checksum function applied to stitching metadata and/or information in the link. For instance, the integrity-verifying data may be a value outputted from a hash or checksum function, having as input the sum of one or more selected values in the query string. In an embodiment, the integrity-verifying data may be computed at least in part based on information outside of the link, such as the identified video segments themselves, or metadata associated therewith. In an embodiment, the integrity-verifying data may be calculated at least in part based on time-sensitive information, such as the current date, thereby creating a time-expiring link.

In any case, before serving a requested video sequence, a video server may recalculate the integrity-verifying data and compare the result of its calculation to the value specified within the link. If the two values do not match, then it is assumed that the link has been tampered with or is otherwise invalid. In response, the video server may take a variety of measures, such as not responding, responding with an error message, responding with a designated video segment or type of video segment (e.g. a promotional message), redirecting the client to a new video segment, responding with only the first segment in the sequence, and so forth. In an embodiment, the video server may take any suitable action so long as the video server does not actually return any video segment specified by the link that is designated to be of a certain type (e.g. the "main feature" content).

4.5. Partial Segments

For simplification, throughout this disclosure, the example video segments that are stitched into video sequences span the entire durations of the respective files or structures in which they are found. However, in certain embodiments, the video segments may be "partial" video segments. That is, each video segment may correspond to only a specified time or byte range within the video data block of a video file or structure. For instance, a video segment may correspond to the first five minutes of a video file, or to a segment within the file that ranges between the timestamps 1:24 and 2:48. In some embodiments, multiple video segments may come from the same video data block of the same file. This may be useful, for instance, to insert other segments into a video, such as commercials into a television show.

In such embodiments, the metadata describing the available segments that may be selected may indicate the specific time span or range of bytes of each segment in addition to the segment's source video file or address. Or, the video segments may be determined programmatically. For instance, a clip may automatically be divided into five minute spans, or an analysis of the video may indicate black frames at which the clip may be divided into segments. The header for each segment may be extracted by taking the header of the video file and adjusting it to include information relevant only to the identified segment. In embodiments where a link is being generated, the bytes and/or timespan that is relevant to the segment may be included in the identifying information for the segment, and/or the offset and length information for the segment may be adjusted to describe only the segment. For instance, the byte offset may be the offset into the file where the segment data begins instead of where the video data block begins, while the length may be the number of bytes within the segment.

4.6. Example System

Figure 7:
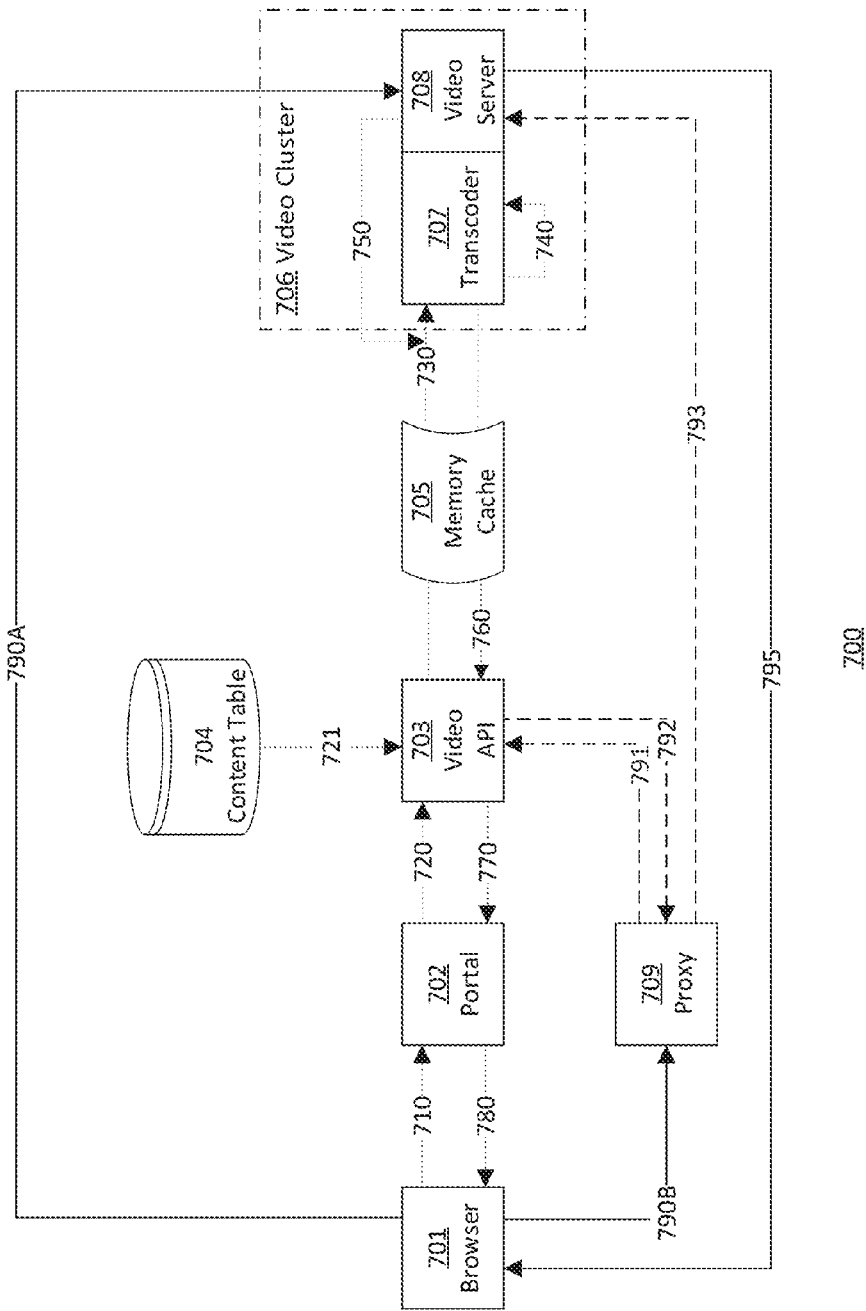
FIG. 7 illustrates information flows in an example system in which the described techniques may be practiced.

FIG. 7 illustrates information flows in an example system 700 in which the described techniques may be practiced, according to an embodiment. In some embodiments, system 700 may be the same system as system 100 and 200, just viewed from a different perspective. The functionality of the various components of system 700 may thus be distributed amongst the components of system 100 and/or 200. In other embodiments, system 700 is an entirely different system than systems 100 and 200. System 700 is again one example of the many types of systems in which the described techniques may be performed, and both the components of system 700 and the flows of communications between components may vary depending on the embodiment.

System 700 comprises a client browser 701 that communicates with a portal 702 to access a web page. System 700 further comprises a video API server 703 that utilizes a content table 704, memory cache 705, and transcoder 707 to generate links to send to portal 702. System 700 further comprises a video server 708 within a video cluster 706 that serves stitched videos in response to browser 701 accessing one of the generated links. System 700 optionally includes a proxy server 709 that rewrites or redirects shortened links to extended links in a format expected by the video server 708. In system 700, information flows related to pre-configuring the server are depicted using dotted lines, while information flows related to serving video data are depicted as solid lines or dashed lines.

Browser 701 begins by sending a message 710 requesting a video playback web page for a specific video from the portal 702. The portal 702 then makes a call 720 to the video API server 703 with the identifier of the video associated with the page. The video API server 703 accesses 721 the content table 704 (or an engine that controls the selection of video sequences) to determine whether any additional video segments, such as ads or logos, should be stitched into the identified video. The content table 704 may further indicate the segment(s) to stitch, or the video API server 703 may utilize any other suitable mechanism to identify the additional video segments. If not additional video segments are to be stitched, a direct link to the identified video may be returned via a message 770.

When a sequence of video segments (i.e. the identified video segments and the additional video segments) is identified, the video API server 703 checks a memory cache 705 to see if a link already exists for the sequence. If so, the link is returned in message 770. Otherwise, the video API server 703 sends a message 730 to the video cluster 706. Upon receiving the message 730, the transcoder 707 generates 740 a number of files: 1) a header file that contains a valid header of the videos as if they were stitched together (e.g. vh.3gh); 2) links to each of the videos (e.g. v1.3gp, v2.3gp, v3.3gp, and so forth); and 3) a file comprising the offset and length of the video data block for each video in the sequence (e.g. vh.info).

The video cluster 706 then generates 750 a video link using the information from vh.info. For instance, supposing the video server were located at videoserver.com, the offsets for each of the three videos were 1000 bytes, 1040 bytes, and 1070 bytes, respectively, and the lengths of the three videos were 100000 bytes, 200000 bytes, and 100000 bytes, the link might be: http://videoserver.com/v1.3gp?stitch=1&v2=v2.3gp&v3=v3.3gp&off1=1000&off2=1040&off3=1070&len1=100000&len2=200000&len3=100000&vh=vh.3gh. If the optional proxy server 709 is being used, and is found at proxyserver.com, a shortened URL might also be generated and returned, such as http://proxyserver.com/sequence-identifier/v1.3gp, where sequence-identifier is a unique identifier associated with the sequence. For instance, the sequence identifier may be a md5 sum of certain information associated with the sequence, a serial number, or any other suitable identifier.

The video cluster 706 then responds 760 to the video API server 703, storing the link in the memory cache 705 along the way. The video API server 703 then responds 770 with the link back to the portal 702. If a shortened URL has been generated, both the serial number and the extended URL are stored in the memory 705, and the shortened URL is returned by the video API server 703 instead of the full URL. The portal 702 then returns 780 a HTML web page showing the link to the browser 701.

The user then clicks on the link, causing the web browser 701 to send a request 790A or 790B. If the video link is in full form, the request 790A is sent directly to the video server 708. Otherwise, the shortened URL is sent 790B to the proxy server 709. The proxy server 709 contacts 791 the video API server 703 for the full URL. The video API server 703 checks the memory cache 705 for the full link and returns 792 it to the proxy server 709. If a full link does not exist, the video API server 703 may optionally repeat 721-760 and then return 792 a full link. The proxy server then redirects 793 the request to the full link, which points to video server 708.

Video server 708 then begins to send video data back to the web browser 701 using the techniques described herein.

4.7. MPEG4-Based Example

Although the techniques described herein may be practiced with respect to video files and structures in a variety of different formats, example considerations for stitching MPEG4-based video files are now explored for illustrative purposes.

Figure 8:
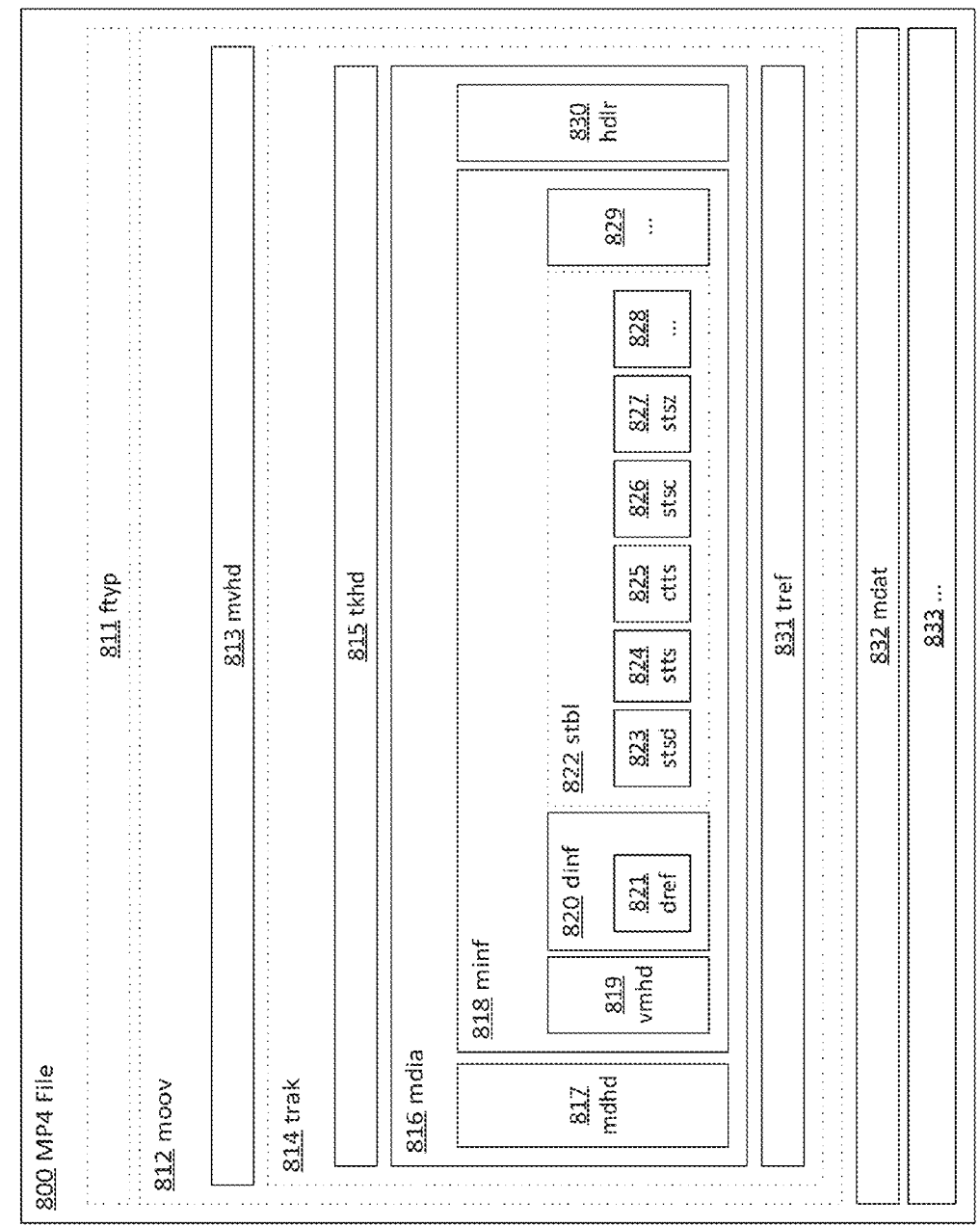
FIG. 8 illustrates the format of an example MPEG4 file that may be stitched, according to an embodiment.

MPEG4 video files are formed as a series of objects, referred to herein as boxes or elements. All data for the file is contained in boxes. FIG. 8 illustrates the format of a typical MPEG4 file 800 that may be stitched, according to an embodiment. File 800 comprises at least elements 811-833. As illustrated, the boxes are arranged as a hierarchy. In an embodiment, certain boxes are more important to the stitching process than others, including ftyp box 811, moov box 812, trak box 814, and stbl box 822. The sample table box (stbl 822) contains several boxes, falling into two groups: those that define layout (size and position) and those that define time and other characteristics. Note that the mdat box 832, or "media data box 832" corresponds to the video data block described in other sections. The preceding boxes 811-831 collectively form the video header block described in other sections.

Figure 9:
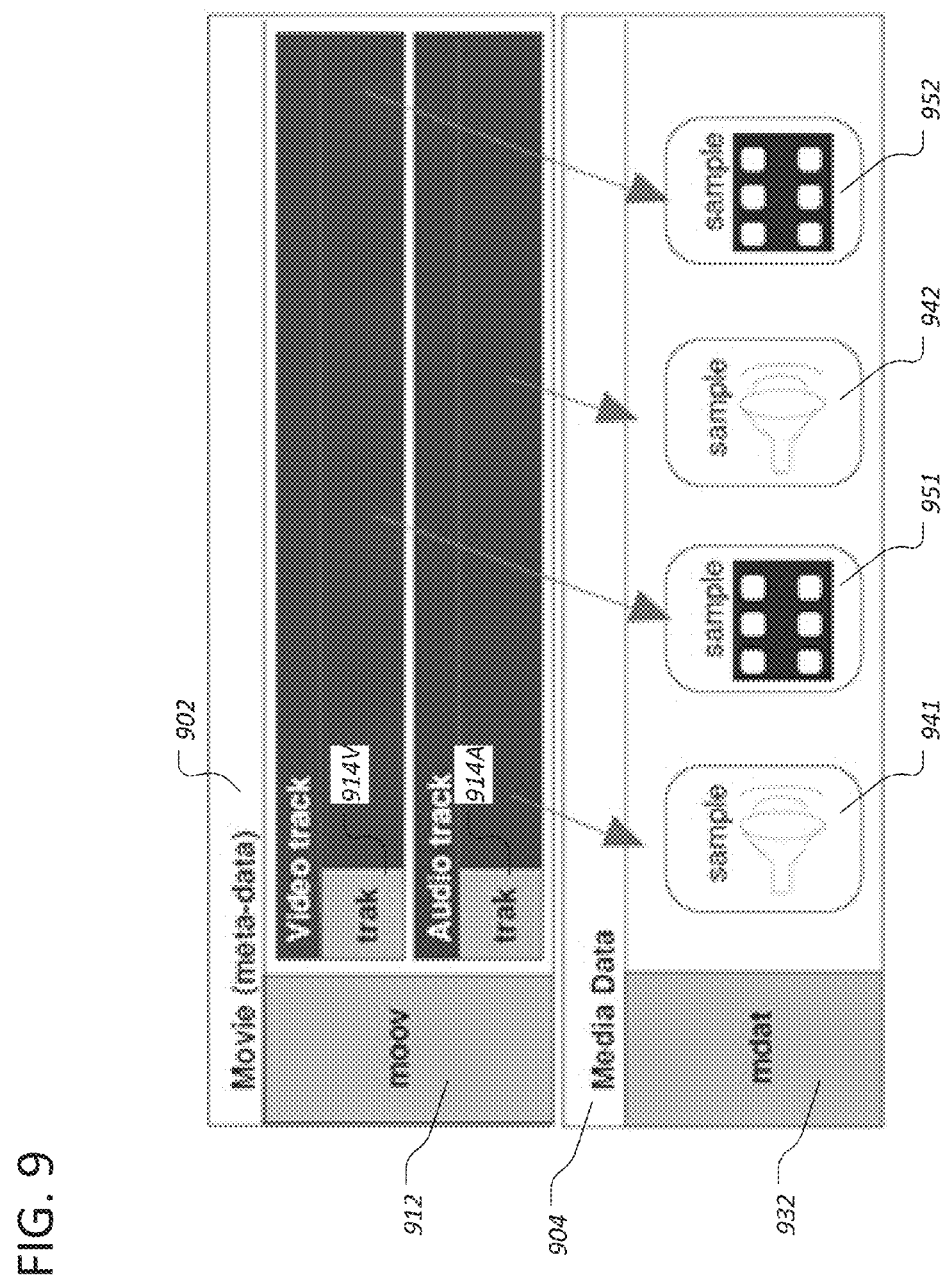
FIG. 9 illustrates certain elements of an example simple interchange MPEG4 file, containing two streams.

When used as an interchange format, MPEG4 files would normally be self-contained (i.e. not referencing media in other files), containing only the media data actually used in the presentation, and not containing any information related to streaming. FIG. 9 illustrates certain elements of an example simple interchange MPEG4 file, containing two streams, according to an embodiment. The header portion 902 of the file moov box comprises a number of elements, including the depicted moov box 912, which in turn comprises trak box 914V that describes the video stream, and trak box 914A that describes the audio stream. The actual streams (i.e. the video data block) are stored in the mdat box 932 of the file. Each stream is broken into constituent samples, which are organized relative to each other so that the stream data for a particular timestamp is found in approximately the same area within the mdat box 932. For instance, the media data may be stored according to a streamable or interleaved storage mode. Samples 941 and 942, described by audio trak box 914A, comprise audio data, while samples 951 and 952, described ny video trak box 914V, comprise video frames. Of course, the mdat box 932 may comprise any number of additional samples described by trak boxes 914V and 914A.

Figure 10:
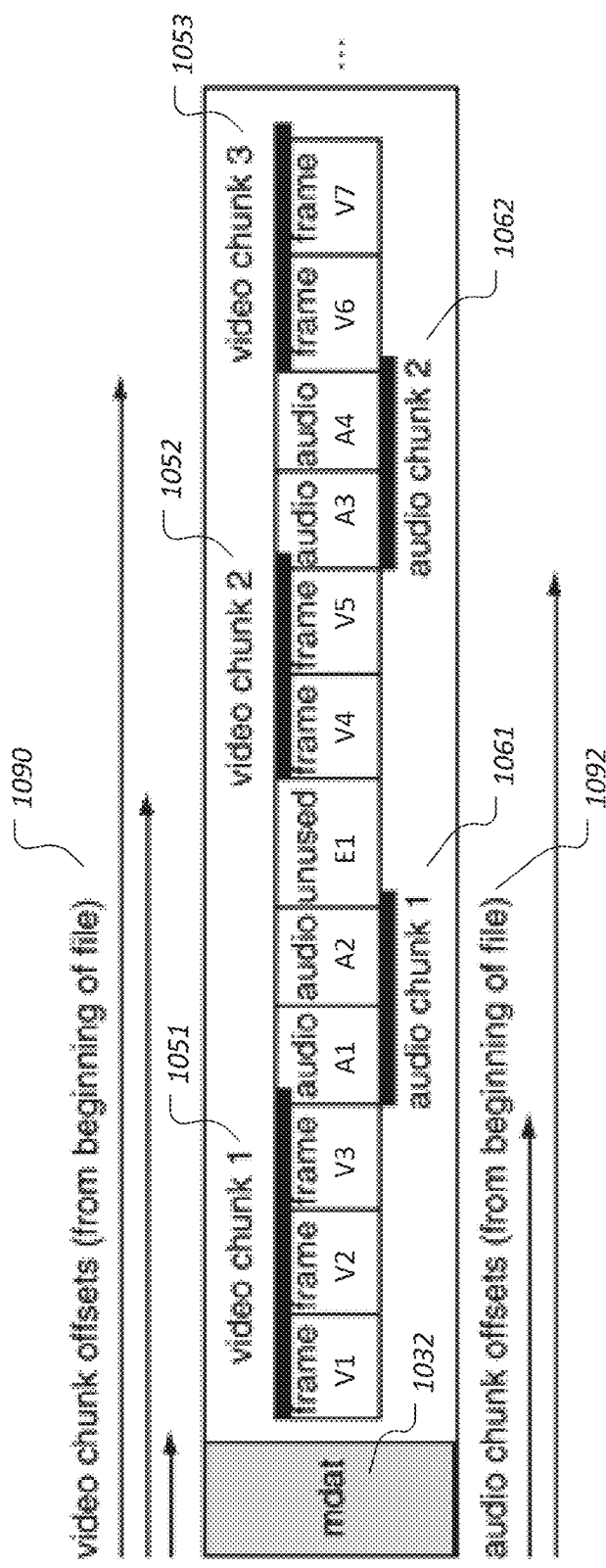
FIG. 10 illustrates an example arrangement of chunks within video data.

Samples within the media data are grouped into chunks. A chunk is a contiguous set of samples for one track. Chunks can be of any size, and the samples within a chunk can also have different sizes. FIG. 10 illustrates an example arrangement of chunks within video data, according to an embodiment. This file comprises an mdat box 1032 comprised of frames of video, including the depicted video frames V1-V7, and audio samples, including the depicted audio samples A1-A4. There are three video chunks 1051-1053, containing video frames V1-V3, V4-V5, and V6-V7, respectively. There are two audio chunks 1061 and 1062, containing audio samples A1-A2, and A3-A4, respectively. In this example, there also is some unused data E1. This unused data E1 might be, for instance, a video frame that has been edited and now stored elsewhere in the file, or any other kind of data that is no longer needed. As illustrated by offsets 1090 and 1092, each chunk may be characterized as being located at an offset relative to the mdat box 1032, and information storing these offsets may be stored in one or more header boxes.

A track box (trak) contains these boxes: a track header box (tkhd), an optional edit-list box (edts), an optional track reference box (tref), and a media box (mdia). The media box in turn contains: a handler box (hdlr), and a media information box (minf). The media information box (minf) contains: a header box specific to the kind of media in the track, a data reference box (dref) with a set of data references, and a sample table (stbl) for the track, with the sample timing and location information.

The sample table contains all the time and data indexing of the media samples in a track. Using the tables here, it is possible to locate samples in time, determine their type (e.g. I-frame or not), and determine their size, container, and offset into that container.

A sample table box (stbl) contains these boxes: a sample description box (stsd), a sample size box (stsz), a sample-to-chunk box (stsc), a chunk offset box (stco) (with 32-bit offsets) or co64 (with 64-bit offsets), a time-to-sample box (stts) providing the sample durations, an optional composition offset box (ctts) providing composition time offsets, a sync sample box (stss), an optional shadow sync sample box (stsh).

The sample description table (stsd) contains, for media tracks, the MPEG-4 ESDs corresponding to that track, and for hint tracks, the name and parameters of the protocol.

The size of each sample is declared in the sample size box (stsz). This box has a count of the number of samples in the track. If the samples are of constant size in bytes, then a single field provides that size. If the size varies, this field is not used, and the box contains a vector with the sizes, one per sample.

As noted previously, the position information is compacted by using the notion of chunks. Within an MP4 file, all of the samples within one chunk are stored contiguously, and they use the same sample description. The sample-to-chunk table (stsc) compactly codes the map from sample number to chunk number and sample description number. For each chunk, the number of samples in that chunk (and the sample description number used) is recorded. The declarations for consecutive chunks using the same values are compacted together.

Then, a chunk offset table (stco) or (co64) records the offset from the beginning of the containing file of each chunk. Given this data, and the size of the preceding samples in the same chunk (which are contiguously stored), a sample may be located. Chunk offsets are in bytes, and may be 32 or 64 bits, depending on the box type.

Samples are stored in the track in decoding order. The decoding time stamp of a sample is determined by adding the duration of all preceding samples (in the applicable edits). The time-to-sample table (stts) gives these durations. This table is run-length coded; each entry specifies a duration and a count of the consecutive samples having that duration.

If the samples have different decoding and composition (display) times, then the composition time table (ctts) gives the positive offsets from decoding to composition time. This table is run-length coded, just like the decoding time table.

Finally, the sync table defines which samples are sync points (I-frames in video), by listing their sample numbers in order. The shadow sync table (stsh) provides alternative samples (AUs) which are random access points, for samples that are not (random access points).

Figure 11:
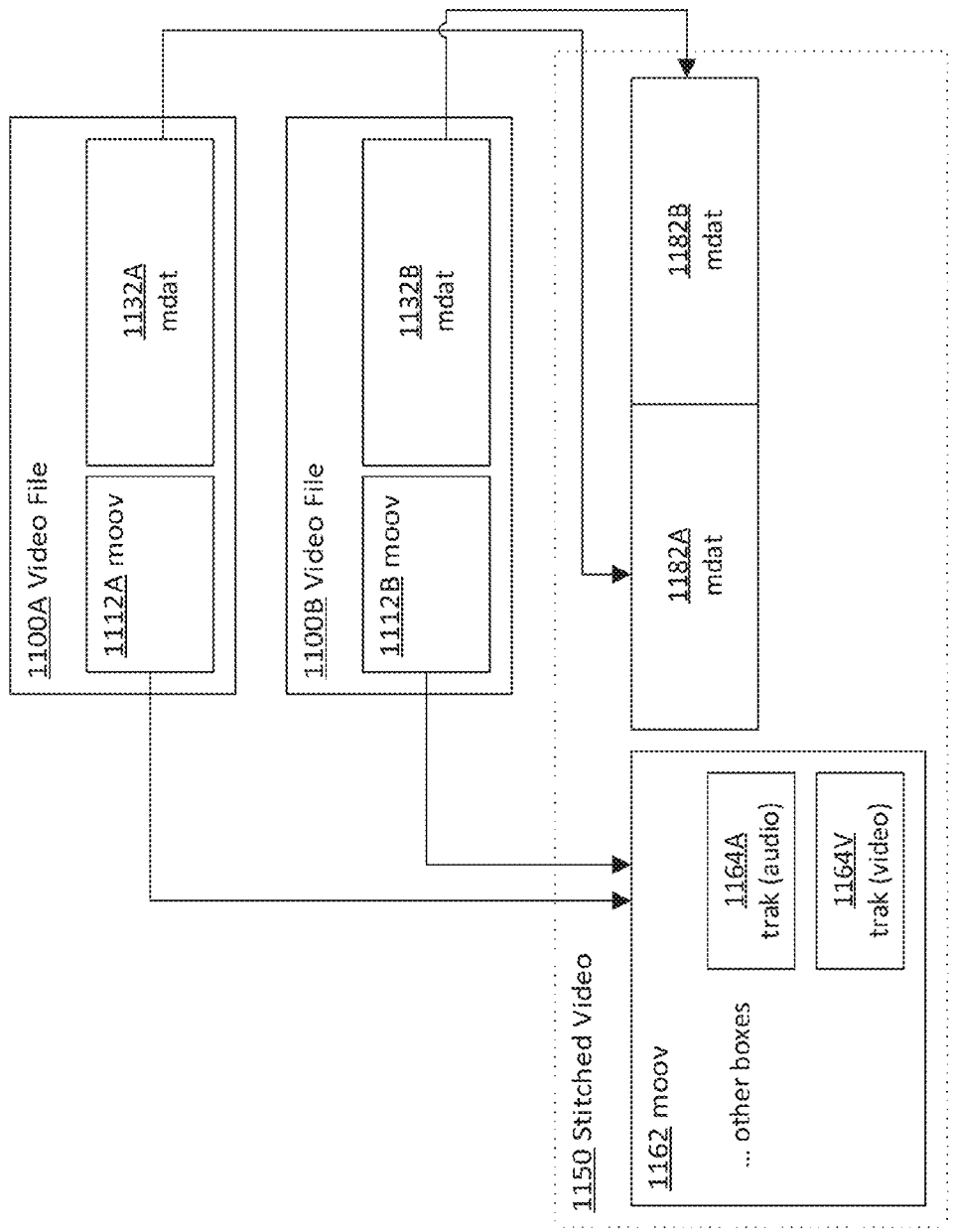
FIG. 11 illustrates various aspects of the stitching of two video files into a stitched video.

FIG. 11 illustrates various aspects of the stitching of two video files 1100A and 1100B into a stitched video 1150, according to an embodiment. The mdat box 1132A of file 1100A and the mdat box 1132B of file 1100B are directly copied to the merged video 1150 without any change. The moov box 1162 in the merged file 1150 is generated from the moov box 1112A of file 1100A and the moov box 1112B of moov box 1100B. The moov box 1162 includes, among other elements, audio trak box 1164A and video trak box 1164V. Of course, various other elements may also be merged into stitched video 1150 as well.

Because the location and time of samples in the merged file are changed, the fields in the sample table box should be changed. Therefore, the boxes in stbl box in the individual video files should not be used directly, and the fields in those boxes need be adjusted before used.

The sample description table gives detailed information about the coding type used, and any initialization information needed for that coding. The entries in stsd box in the first video file 1100A are added first to stsd box in merged file 1150, and the entries in the stsd box of the second video file 1100B are concatenated to it. If the entries in the stsd box of file 1100A are the same as that in the stsd box of 1100B, there is no need to add entries from the stsd box of file 1100B.

The decoding time-to-sample box contains a compact version of a table that allows indexing from decoding time to sample number. In the stts box in the merged file, the sample_delta of file 1100A is stored before the sample_delta of file 1100B. But if the two figures are same, one sample_delta is used instead.

The sync sample box provides a compact marking of the random access points within the stream. Since video file 1100B is concatenated to video file 1100A, the sample_number identifiers assigned to the samples from video file 1100A are smaller than those from video file 1100B. The sample_number identifiers in stss box in video file 1100A can be used directly, and the number of samples in the video file 1100A are added to the sample_number identifiers in video file 1100B.

The sample-to-chunk table is compactly coded. Each entry gives the index of the first chunk of a run of chunks with the same characteristics. By subtracting one entry from the previous one, one may compute how many chunks are in the run. One may convert this to a sample count by multiplying by the appropriate samples-per-chunk value. For the merger process, the first_chunk and sample_description_index fields should be adjusted for video file 1100B: first_chunk should be added to the number of chunks in video file 1100A, and sample_description_index should point to its related sample description entry. The entries in the stsc box in the video file 1100A are added first to stsc box in the merged file 1150, and those in the video file 1100B are added thereafter.

The sample size box contains the sample count and a table giving the size in bytes of each sample. For the merger process, the entries in the stsz box in video file 1100A are simply concatenated to those of the stsz box in video file 1100B.

The chunk offset table gives the index of each chunk into the containing file. Offsets may be file offsets, as opposed to the offset into any box within the file. Each chunk_offset value should be adjusted according to the location of its corresponding media data box. For video file 1100A, each chunk_offset is incremented by (offset_mdat_from_A_in_merge−offset_mdat_in_A), while, for video file 1100B, each chunk_offset is incremented by (offset_mdat_from_B_in_merge−offset_mdat_in_B), where the offset of the mdat box 1132A in video file 1100A is offset_mdat_in_A, the offset of the mdat box 1132B in the video file 1100B is offset_mdat_in_B, the offset of the mdat box 1132A in merged video 1150 is offset_mdat_from_A_in_merge, and the offset of the mdat box 1132B in merged video 1150 is offset_mdat_from_content_in_merge. The chunk offset tables can then be concatenated together to form the stco box of the merged video 1150.

Other examples of fields in the moov box 1162 that should be computed from the moov boxes 1112 of the individual video files include: timescale and duration in mvhd box, duration in tkhd box, and timescale and duration in mdhd box.

A set of structures known as an edit list can provide an explicit map of how the timeline of a single track should be mapped into the timeline of the presentation. Edit lists allow for the insertion of empty time and the use (and reuse) of sections of the timeline. So, a repeated piece of media can be defined once and used repeatedly by reference.

Figure 12:
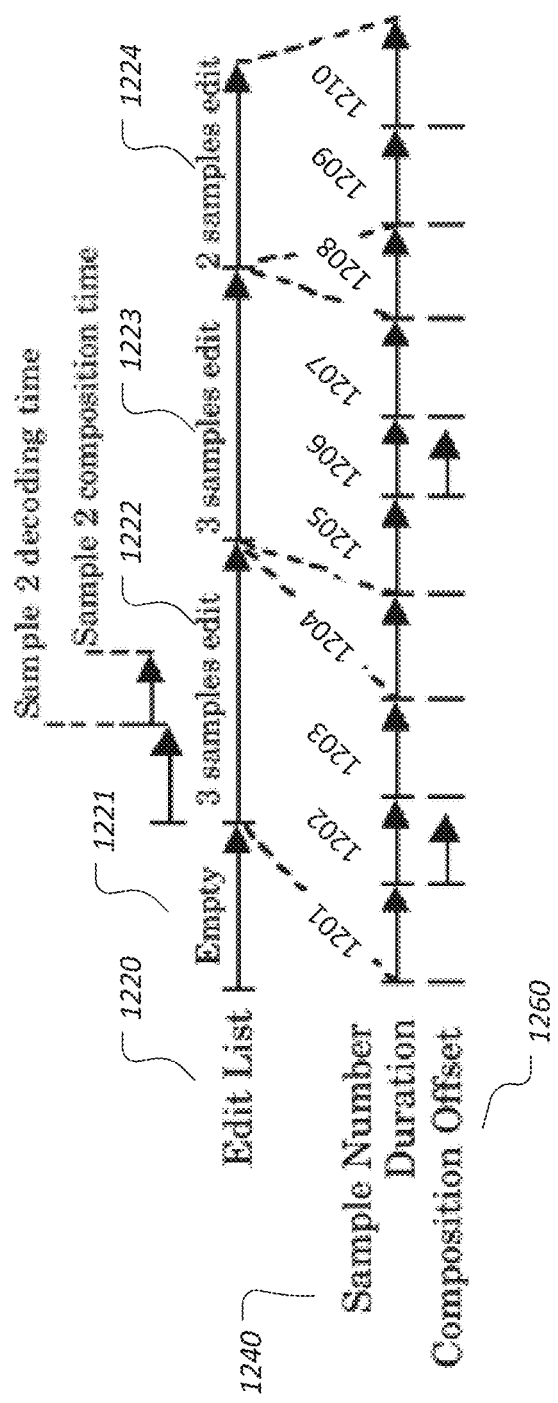
FIG. 12 illustrates an example edit list.

FIG. 12 illustrates an example edit list 1220, according to an embodiment. A simple timeline of ten samples, labeled samples 1201-1210, is shown with an edit list. The edit list 1220 contains four edits: an empty edit 1221, then two edits 1222 and 1223 each containing three samples, and finally an edit 1224 containing two samples. As an example, the computation of the time stamps for the second sample involves adding sample number durations 1240, including the (a) the duration of the empty edit; (b) the duration of the preceding sample in the edit, which gives the decoding time for this sample; and (c) the composition offset 1260 for this sample, which, added to the decoding time, gives the composition time.

As a result of the merger, there are two segments in an edit list for each merged track. The duration of the first segment is the duration of related track in the first video file 1100A, while the duration of the second segment is that of the second video file 1100B. If the duration of an audio track is different from that of the video track in video file 1100A, an empty segment can be inserted between the segments to solve sync problems in the merged video 1150.

5.0. Example Embodiments

Examples of some embodiments are represented, without limitation, in the following paragraphs:

According to an embodiment, a method comprises: identifying a sequence of video files to stitch together, each video file in the sequence having a video header block and a video data block; based on the sequence and on the length of each video data block, merging each video header block together to form a merged video header block for the sequence; receiving, from a client device, across a network, one or more requests to stream the sequence of video files; responsive to the request, streaming the merged video header block to the client device, followed by each video data block, in an order defined by the sequence, each video data block being streamed from its containing video file.

In an embodiment, the method further comprises streaming the sequence of video files as a single video stream to the client device without storing the single video stream as a distinct file at a server system that performs the method.

In an embodiment, identifying the sequence comprises dynamically selecting at least one of the video files to include in the sequence based on information in the one or more requests to stream the sequence.

In an embodiment, the method further comprises: receiving, prior to the one or more requests to stream the sequence, an initial request; in response to the initial request: determining the video files to include in the sequence, the determining including dynamically selecting at least one of the video files based on information in the initial request; generating a link to the sequence, the link including one or more identifiers associated with the sequence; returning the link in response to the initial request; wherein identifying the sequence is responsive to receiving the link in the one or more requests to stream the sequence, the video files being identified based on the one or more identifiers in the link.

In an embodiment, the method further comprises: in response to the initial request, generating and storing the merged video header block; in response to the one or more requests to stream the sequence, locating and reading the merged video header block based on the one or more identifiers in the link.

In an embodiment, the one or more identifiers include file names of the video files, and the link includes integrity verification data.

In an embodiment, the method further comprises: in response to the initial request, generating stitching metadata, the stitching metadata including segment lengths that indicate byte sizes of each video data block, and segment offsets that indicate offsets within the video files at which each video data block begins; wherein the link includes or references the stitching metadata.

In an embodiment, merging each video header block comprises merging different types of sections found within each video header block, the different types of sections including chunk offset information and sample information, the merging further comprising adjusting addresses within the sections based on lengths of each video data block and the sequence of the video files.

According to an embodiment, a method comprising: identifying video segments to include in a stitched video, the video segments arranged in a sequence; reading video headers for the identified video segments, each segment having a separate video header; based on the sequence, merging the video headers to generate a combined video header for the stitched video; receiving, from a client device, across a network, one or more requests for contents of the stitched video; responsive to the one or more requests for the contents of the stitched video, sending at least a portion of the stitched video to the client device, the sending comprising at least: serving the combined video header to client device; identifying video data blocks that correspond to the video segments, at least two of the identified video segments corresponding to distinct video data blocks from different video structures; for each particular video segment of the at least two of the identified video segments, in an order defined by the sequence, reading particular contents of a particular video data block corresponding to the particular video segment, and sending the particular contents to the client device.

In an embodiment, the method further comprises sending at least the portion of the stitched video to the client device without storing the stitched video as a file at a server system from which the stitched video is sent.

In an embodiment, each identified video segment corresponds to a different video file.

In an embodiment, different video segments correspond to different video files;
reading the video headers comprises extracting, from each of the video files, a corresponding one of the video headers; and sending the stitched video comprises, for each given segment of the identified video segments, in the order defined by the sequence, extracting a corresponding video data block for the given segment from a corresponding one of the video files, and sending the corresponding video data block to the client device.

In an embodiment, the method further comprises sending the combined video header and the contents of each particular video data block as a single video stream.

In an embodiment, the method further comprises: sending the combined video header and the contents of each particular video data block as a single video stream; wherein the one or more requests include at least a first request for a first part of the video stream and a second request to skip to a second part of the video stream; responsive to the first request, sending the combined video header and at least first contents from a first video data block corresponding to a first video segment in the sequence; responsive to the second request: identifying a position within a second video data block that corresponds to the second part; reading second contents of the second video data block beginning at the position; sending the second contents without sending at least certain contents found in the first video data block and in the second data block, the certain contents skipped as a result of the second request.

In an embodiment, identifying the video segments comprises dynamically selecting at least one of the video segments to include in the stitched video based on information in the one or more requests for contents.

In an embodiment, the method further comprises: receiving, prior to the one or more requests for contents, an initial request; in response to the initial request: determining the video segments to include in the stitched video, the determining including dynamically selecting at least one of the video segments based on information in the initial request; generating a link to the stitched video, the link including one or more identifiers associated with the selected stitched video; returning the link in response to the initial request; wherein identifying the video segments is responsive to receiving the link in the one or more requests for contents, the video segments being identified based on the one or more identifiers in the link.

In an embodiment, the method further comprises: in response to the initial request, generating and storing the combined video header; in response to the one or more requests for contents, locating and reading the combined video header based on the one or more identifiers in the link.

In an embodiment, the one or more identifiers include identifiers of particular video files corresponding to particular video segments, and the link includes integrity verification data.

In an embodiment, the method further comprises: in response to the initial request, generating stitching metadata, the stitching metadata including segment lengths for the video segments that indicate byte sizes of the video data blocks to which the video segments correspond, and segment offsets for the video segments that indicate particular offsets within particular video files at which particular ones of the video data blocks begin; wherein the link includes or references the stitching metadata.

In an embodiment, the initial request requests a first video segment of the identified video segments, wherein determining the video segments comprises determining, based on the first video segment, one or more second video segments to stitch before the first video segment.

In an embodiment, the one or more requests are one or more requests to stream a first video segment of the identified video segments, wherein identifying the video segments comprises identifying, based on the first video segment, one or more second video segments to stream with the first video segment.

In an embodiment, merging the video headers comprises merging different types of sections found within each of the video headers, the different types of sections including chunk offset information and sample information, the merging further comprising adjusting addresses within the sections based on the sequence and on lengths of the video data blocks corresponding to the video segments.

According to an embodiment, a method comprises: receiving a first request to preconfigure a server for serving a stitched video; responsive to the first request, identifying a sequence of video segments to include in the stitched video; extracting, from video files corresponding to the video segments, video header blocks for the video segments; generating a merged video header block by merging the video header blocks together based on the sequence and on the lengths of video data blocks within the video files; storing the merged video header block as a header file; generating a Uniform Resource Locator ("URL") that includes or references information that identifies: each of the video files, the header file, the lengths, and offsets within the video files at which the video data blocks are found; responding to the first request with the URL; receiving, from a client device, one or more second requests directed to the URL; responsive to the one or more second requests, and based on the information included in or referenced by the URL: locating the video files and the header file based on the URL received in the one or more second requests; streaming the stitched video to the client device by serving the header file followed by content from each of the video data blocks, in turn, from their respective video files.

In an embodiment, the URL directly identifies each of the video files, the header file, the lengths, and the offsets, wherein the URL further includes checksum data, the method further comprising: verifying that the URL has not been tampered with based on the checksum data.

In an embodiment, the method further comprises: generating the merged video header block and the URL only after determining that the merged video header block and the URL are not already stored in one or more storage locations; storing the merged video header block and the URL in the one or more storage locations.

In an embodiment, the method further comprises: receiving the first request from a web portal; wherein the web portal is configured to generate a web page that embeds the URL and to send the web page to the client device; receiving the one or more second requests responsive to the client device accessing the web page.

In an embodiment, the method further comprises receiving the one or more second requests via a proxy server.

In an embodiment, the method further comprises skipping streaming of certain contents in certain video data blocks of the video data blocks responsive to byte range requests from the client device, the byte range requests specifying byte addresses relative to the sequence, the streaming comprising translating the sequence-relative byte addresses to byte addresses within the video files based on the lengths and the offsets.

According to an embodiment, a system comprises: a video repository that stores video segments; a sequence selector configured to identify sequences of the video segments; a sequence metadata generator configured to read video header blocks of video segments that the sequence selector selected to be in a sequence, and to merge the video header blocks together to form a combined video header for the sequence; a video server configured to receive requests to send contents of the sequences to clients, and to respond to the requests by sending, for each requested sequence, the combined video header generated for the sequence followed by video data blocks of the video segments that the sequence selector selected to be in the sequence, in an order defined by the sequence.

In an embodiment, the system further comprises: a link generator configured to generate links for the sequences, each link including or referencing sequence information that identifies at least: a) a set of video segments selected to be in a corresponding sequence for the link, and b) a location in which the sequence metadata generator has stored the combined video header for the sequence; a link server configured to send links generated by the link generator in response to initial requests for links to sequences; wherein the requests received by the video server specify particular links generated by the link generator, the video sever configured to use the sequence information included in or referenced by a given link to locate a given combined video header and set of video files to use when sending the contents of a given sequence requested by the given link.

In an embodiment, the system further comprises: a cache configured to store links generated by the link generator, wherein the link server is configured to search the cache for a pre-existing link for a particular sequence prior to requesting that the link generator generate a particular link for the particular sequence.

In an embodiment, the system further comprises: a proxy server that rewrites or redirects requests for shortened links to links generated by the link generator, the links generated by the link generator including the corresponding sequence information.

In an embodiment, the system further comprises: one or more web portals configured to send the initial requests to the link server and embed the links received from the link generator within web pages served to the client devices; client devices configured to send requests for the links over a network to the video server in response to reading the links embedded within the web pages.

In an embodiment, the video server is configured to respond to byte-range requests to skip contents in the sequences.

In an embodiment, the sequence selector is configured to dynamically select one or more of the video segments included in certain sequences.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 13:
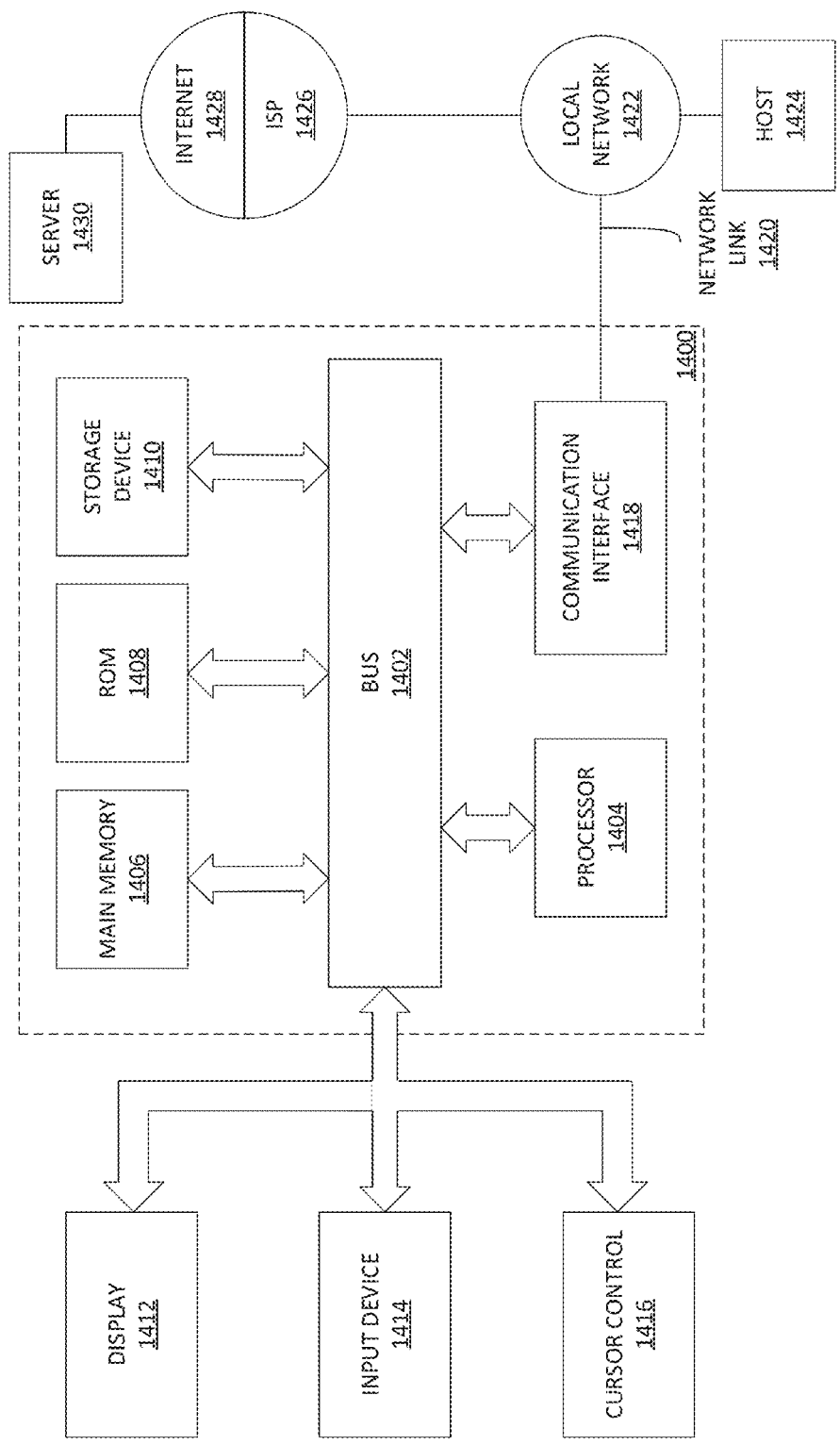
FIG. 13 is block diagram of a computer system upon which embodiments of the invention may be implemented.

FIG. 13 is a block diagram that illustrates a computer system 1300 utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more busses 1302 or other communication mechanism for communicating information, and one or more hardware processors 1304 coupled with busses 1302 for processing information. Hardware processors 1304 may be, for example, a general purpose microprocessor. Busses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send messages and receive data, including program code and/or other types of instructions, through the network(s), network link 1320, and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In an embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a first request to preconfigure a server for serving a stitched video;
   responsive to the first request, identifying a sequence of video segments to include in the stitched video;
   extracting, from video files corresponding to the video segments, video header blocks for the video segments;
   generating a merged video header block by merging the video header blocks together based on the sequence and on the lengths of video data blocks within the video files;
   storing the merged video header block as a header file;
   generating a Uniform Resource Locator ("URL") that includes or references information that identifies: each of the video files, the header file, the lengths, and offsets within the video files at which the video data blocks are found;
   responding to the first request with the URL;
   receiving, from a client device, one or more second requests directed to the URL;
   responsive to the one or more second requests, and based on the information included in or referenced by the URL:
   locating the video files and the header file based on the URL received in the one or more second requests;

streaming the stitched video to the client device by serving the header file followed by content from each of the video data blocks, in turn, from their respective video files.

2. The method of claim 1, wherein the URL directly identifies each of the video files, the header file, the lengths, and the offsets, wherein the URL further includes checksum data, the method further comprising: verifying that the URL has not been tampered with based on the checksum data.

3. The method of claim 1, further comprising:
generating the merged video header block and the URL only after determining that the merged video header block and the URL are not already stored in one or more storage locations;
storing the merged video header block and the URL in the one or more storage locations.

4. The method of claim 1, further comprising:
receiving the first request from a web portal;
wherein the web portal is configured to generate a web page that embeds the URL and to send the web page to the client device;
receiving the one or more second requests responsive to the client device accessing the web page.

5. The method of claim 1, further comprising receiving the one or more second requests via a proxy server.

6. The method of claim 1, further comprising skipping streaming of certain contents in certain video data blocks of the video data blocks responsive to byte range requests from the client device, the byte range requests specifying byte addresses relative to the sequence, the streaming comprising translating the sequence-relative byte addresses to byte addresses within the video files based on the lengths and the offsets.

7. A system comprising:
a video repository that stores video segments;
a sequence selector configured to identify sequences of the video segments;
a sequence metadata generator configured to read video header blocks of video segments that the sequence selector selected to be in a sequence, and to merge the video header blocks together to form a combined video header for the sequence;
a link generator configured to generate links for the sequences, each link including or referencing sequence information that identifies at least a set of video segments selected to be in a corresponding sequence for the link;
a link server configured to send links generated by the link generator in response to initial requests for links to sequences;
a video server configured to receive requests to send contents of the sequences to clients, and to respond to the requests by sending, for each requested sequence, the combined video header generated for the sequence followed by video data blocks of the video segments that the sequence selector selected to be in the sequence, in an order defined by the sequence, the requests received by the video server specifying particular links generated by the link generator, the video sever configured to use the sequence information included in or referenced by a given link to locate a set of video files to use when sending the contents of a given sequence requested by the given link.

8. The system of claim 7:
wherein the sequence information in each link generated by the link generator further identifies at least a location in which the sequence metadata generator has stored the combined video header for the sequence;
wherein the video server is further configured to use the sequence information included in or referenced by a given link to locate a given combined video header of a given sequence requested by the given link.

9. The system of claim 7, further comprising:
a cache configured to store links generated by the link generator, wherein the link server is configured to search the cache for a pre-existing link for a particular sequence prior to requesting that the link generator generate a particular link for the particular sequence.

10. The system of claim 7, further comprising:
a proxy server that rewrites or redirects requests for shortened links to links generated by the link generator, the links generated by the link generator including the corresponding sequence information.

11. The system of claim 7, further comprising:
one or more web portals configured to send the initial requests to the link server and embed the links received from the link generator within web pages served to the client;
client devices configured to send requests for the links over a network to the video server in response to reading the links embedded within the web pages.

12. The system of claim 7, wherein the video server is configured to respond to byte-range requests to skip contents in the sequences.

13. The system of claim 7, wherein the sequence selector is configured to dynamically select one or more of the video segments included in certain sequences.

14. A method comprising:
identifying a sequence of video files to stitch together, each video file in the sequence having a video header block and a video data block;
based on the sequence and on the length of each video data block, merging each video header block together to form a merged video header block for the sequence;
receiving, from a client device, across a network, one or more requests to stream the sequence of video files;
responsive to the request, streaming the merged video header block to the client device, followed by content from each video data block, in an order defined by the sequence, the content from each video data block being streamed from its containing video file;
receiving, prior to the one or more requests to stream the sequence, an initial request;
in response to the initial request:
determining the video files to include in the sequence, the determining including selecting at least one of the video files based on information in the initial request;
generating a link to the sequence, the link including one or more identifiers associated with the sequence;
returning the link in response to the initial request;
wherein identifying the sequence is responsive to receiving the link in the one or more requests to stream the sequence, the video files being identified based on the one or more identifiers in the link.

15. The method of claim 14,
further comprising streaming the sequence of video files as a single video stream to the client device without storing the single video stream as a distinct file at a server system that performs the method.

16. The method of claim 14, wherein determining the video files to include in the sequence comprises dynamically selecting at least one of the video files to include in the sequence based on information in the initial request.

17. The method of claim 14, wherein the one or more identifiers include file names of the video files, and the link includes integrity verification data.

18. The method of claim 14, further comprising:
   in response to the initial request, generating stitching metadata, the stitching metadata including segment lengths that indicate byte sizes of each video data block, and segment offsets that indicate offsets within the video files at which each video data block begins;
   wherein the link includes or references the stitching metadata.

19. The method of claim 14, wherein merging each video header block comprises merging different types of sections found within each video header block, the different types of sections including chunk offset information and sample information, the merging further comprising adjusting addresses within the sections based on lengths of each video data block and the sequence of the video files.

20. The method of claim 14, further comprising skipping streaming of certain contents in certain video data blocks of the video data blocks responsive to byte range requests from the client device, the byte range requests specifying byte addresses relative to the sequence, the streaming comprising translating the sequence-relative byte addresses to byte addresses within the video files.

21. The method of claim 14, further comprising generating the merged video header block prior to the one or more requests to stream the sequence, the link specifying a location at which the merged video header block is stored.

22. One or more non-transitory computer-readable media storing instructions that, when executed by one or more computing devices, cause:
   receiving a first request to preconfigure a server for serving a stitched video;
   responsive to the first request, identifying a sequence of video segments to include in the stitched video;
   extracting, from video files corresponding to the video segments, video header blocks for the video segments;
   generating a merged video header block by merging the video header blocks together based on the sequence and on the lengths of video data blocks within the video files;
   storing the merged video header block as a header file;
   generating a Uniform Resource Locator ("URL") that includes or references information that identifies: each of the video files, the header file, the lengths, and offsets within the video files at which the video data blocks are found;
   responding to the first request with the URL;
   receiving, from a client device, one or more second requests directed to the URL;
   responsive to the one or more second requests, and based on the information included in or referenced by the URL:
      locating the video files and the header file based on the URL received in the one or more second requests;
      streaming the stitched video to the client device by serving the header file followed by content from each of the video data blocks, in turn, from their respective video files.

23. The one or more non-transitory computer-readable media of claim 22, wherein the URL directly identifies each of the video files, the header file, the lengths, and the offsets, wherein the URL further includes checksum data, the method further comprising: verifying that the URL has not been tampered with based on the checksum data.

24. The one or more non-transitory computer-readable media of claim 22, wherein the instructions, when executed by the one or more computing devices, further cause:
   generating the merged video header block and the URL only after determining that the merged video header block and the URL are not already stored in one or more storage locations;
   storing the merged video header block and the URL in the one or more storage locations.

25. The one or more non-transitory computer-readable media of claim 22, wherein the instructions, when executed by the one or more computing devices, further cause:
   receiving the first request from a web portal;
   wherein the web portal is configured to generate a web page that embeds the URL and to send the web page to the client device;
   receiving the one or more second requests responsive to the client device accessing the web page.

26. The one or more non-transitory computer-readable media of claim 22, wherein the instructions, when executed by the one or more computing devices, further cause receiving the one or more second requests via a proxy server.

27. The one or more non-transitory computer-readable media of claim 22, wherein the instructions, when executed by the one or more computing devices, further cause skipping streaming of certain contents in certain video data blocks of the video data blocks responsive to byte range requests from the client device, the byte range requests specifying byte addresses relative to the sequence, the streaming comprising translating the sequence-relative byte addresses to byte addresses within the video files based on the lengths and the offsets.

28. One or more non-transitory computer-readable media storing instructions that, when executed by one or more computing devices, cause:
   identifying a sequence of video files to stitch together, each video file in the sequence having a video header block and a video data block;
   based on the sequence and on the length of each video data block, merging each video header block together to form a merged video header block for the sequence;
   receiving, from a client device, across a network, one or more requests to stream the sequence of video files;
   responsive to the request, streaming the merged video header block to the client device, followed by content from each video data block, in an order defined by the sequence, the content from each video data block being streamed from its containing video file;
   receiving, prior to the one or more requests to stream the sequence, an initial request;
   in response to the initial request:
      determining the video files to include in the sequence, the determining including selecting at least one of the video files based on information in the initial request;
      generating a link to the sequence, the link including one or more identifiers associated with the sequence;
      returning the link in response to the initial request;
   wherein identifying the sequence is responsive to receiving the link in the one or more requests to stream the sequence, the video files being identified based on the one or more identifiers in the link.

29. The one or more non-transitory computer-readable media of claim 28, wherein the instructions, when executed by the one or more computing devices, further cause streaming the sequence of video files as a single video stream to the client device without storing the single video stream as a distinct file at a server system that executes the instructions.

30. The one or more non-transitory computer-readable media of claim 28, wherein determining the video files to include in the sequence comprises dynamically selecting at least one of the video files to include in the sequence based on information in the initial request.

31. The one or more non-transitory computer-readable media of claim 28, wherein the one or more identifiers include file names of the video files, and the link includes integrity verification data.

32. The one or more non-transitory computer-readable media of claim 28, wherein the instructions, when executed by the one or more computing devices, further cause:
in response to the initial request, generating stitching metadata, the stitching metadata including segment lengths that indicate byte sizes of each video data block, and segment offsets that indicate offsets within the video files at which each video data block begins;
wherein the link includes or references the stitching metadata.

33. The one or more non-transitory computer-readable media of claim 28, wherein merging each video header block comprises merging different types of sections found within each video header block, the different types of sections including chunk offset information and sample information, the merging further comprising adjusting addresses within the sections based on lengths of each video data block and the sequence of the video files.

34. The one or more non-transitory computer-readable media of claim 28, wherein the instructions, when executed by the one or more computing devices, further cause:
skipping streaming of certain contents in certain video data blocks of the video data blocks responsive to byte range requests from the client device, the byte range requests specifying byte addresses relative to the sequence, the streaming comprising translating the sequence-relative byte addresses to byte addresses within the video files.

35. The one or more non-transitory computer-readable media of claim 28, wherein the instructions, when executed by the one or more computing devices, further cause generating the merged video header block prior to the one or more requests to stream the sequence, the link specifying a location at which the merged video header block is stored.

* * * * *